United States Patent
Jung et al.

(10) Patent No.: US 10,241,510 B2
(45) Date of Patent: Mar. 26, 2019

(54) METHOD AND APPARATUS FOR CONTROLLING VEHICLE

(71) Applicant: Samsung Electronics Co., Ltd., Gyeonggi-do (KR)

(72) Inventors: Woo-jin Jung, Gyeonggi-do (KR); Myung-sik Kim, Gyeonggi-do (KR); Je-woong Ryu, Gyeonggi-do (KR); Seung-beom Han, Gyeonggi-do (KR); Chang-soo Park, Seoul (KR); Aron Baik, Seoul (KR); Jung-gap Kuk, Seoul (KR); Jung-hoon Park, Seoul (KR); Jin-woo Yoo, Gyeonggi-do (KR); Mid-eum Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/214,107

(22) Filed: Jul. 19, 2016

(65) Prior Publication Data

US 2017/0235305 A1 Aug. 17, 2017

(30) Foreign Application Priority Data

Feb. 11, 2016 (KR) ........................ 10-2016-0015478

(51) Int. Cl.
*G05D 1/00* (2006.01)
*G05D 1/02* (2006.01)
(Continued)

(52) U.S. Cl.
CPC ........... *G05D 1/0061* (2013.01); *B60W 30/10* (2013.01); *B60W 40/072* (2013.01);
(Continued)

(58) Field of Classification Search
CPC ................. G05D 1/0061; G05D 1/021; G05D 2201/0213; B60W 40/072; B60W 30/10;
(Continued)

(56) References Cited

U.S. PATENT DOCUMENTS

| 8,433,470 B1 | 4/2013 | Szybalski et al. |
| 2014/0088814 A1 | 3/2014 | You et al. |

(Continued)

FOREIGN PATENT DOCUMENTS

JP 2005-250564 9/2005

OTHER PUBLICATIONS

International Search Report dated Nov. 17, 2016 issued in counterpart application No. PCT/KR2016/008720, 13 pages.

*Primary Examiner* — Brian P Sweeney
(74) *Attorney, Agent, or Firm* — The Farrell Law Firm, P.C.

(57) ABSTRACT

Methods and apparatuses are provided for controlling a vehicle. The vehicle is controlled to operate in an autonomous driving mode in which the vehicle is driven without a manipulation by an operator of the vehicle. A request to switch to a manual driving mode, in which the vehicle is driven with the manipulation by the operator, is received. A range of the manipulation regarding a function of the vehicle is determined according to a driving situation of the vehicle in response to the request. The vehicle is controlled to operate in the manual driving mode in which the manipulation by the operator is limited according to the range of the manipulation.

14 Claims, 21 Drawing Sheets

(51) Int. Cl.
*B60W 40/072* (2012.01)
*B60W 50/00* (2006.01)
*B60W 50/08* (2012.01)
*B60W 50/12* (2012.01)
*B60W 30/10* (2006.01)

(52) U.S. Cl.
CPC ...... *B60W 50/0097* (2013.01); *B60W 50/082* (2013.01); *B60W 50/12* (2013.01); *G05D 1/021* (2013.01); *B60W 2550/146* (2013.01); *B60W 2550/402* (2013.01); *G05D 2201/0213* (2013.01)

(58) Field of Classification Search
CPC ............. B60W 50/12; B60W 50/0097; B60W 50/082; B60W 2550/402; B60W 2550/146
USPC .......................................................... 701/23
See application file for complete search history.

(56) References Cited

U.S. PATENT DOCUMENTS

| | | | | |
|---|---|---|---|---|
| 2014/0303827 A1* | 10/2014 | Dolgov | ................. | B60W 30/00 701/23 |
| 2015/0088357 A1 | 3/2015 | Yopp | | |
| 2015/0346724 A1* | 12/2015 | Jones | .................... | B60W 30/12 701/23 |

* cited by examiner

FIG. 1
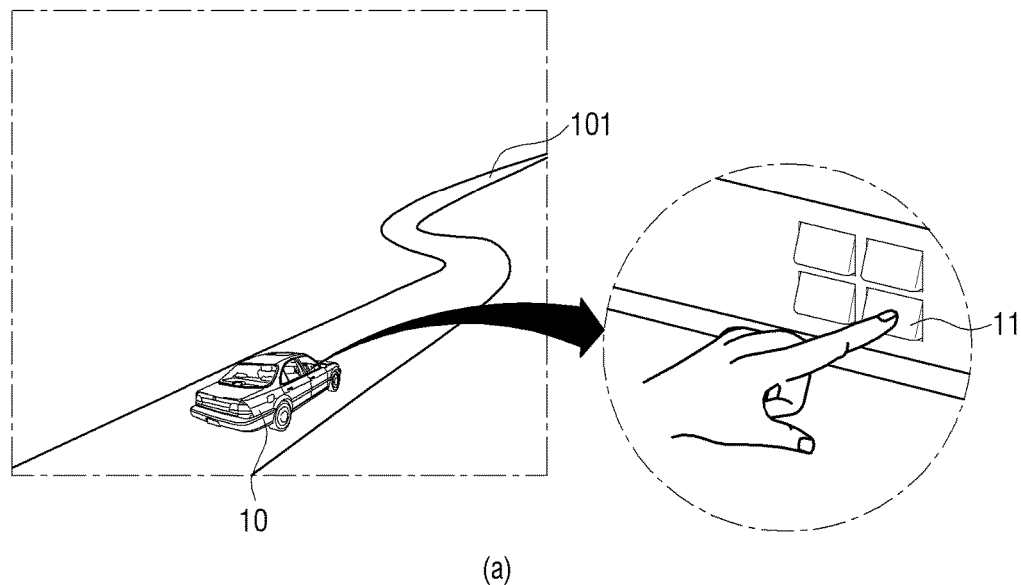
(a)
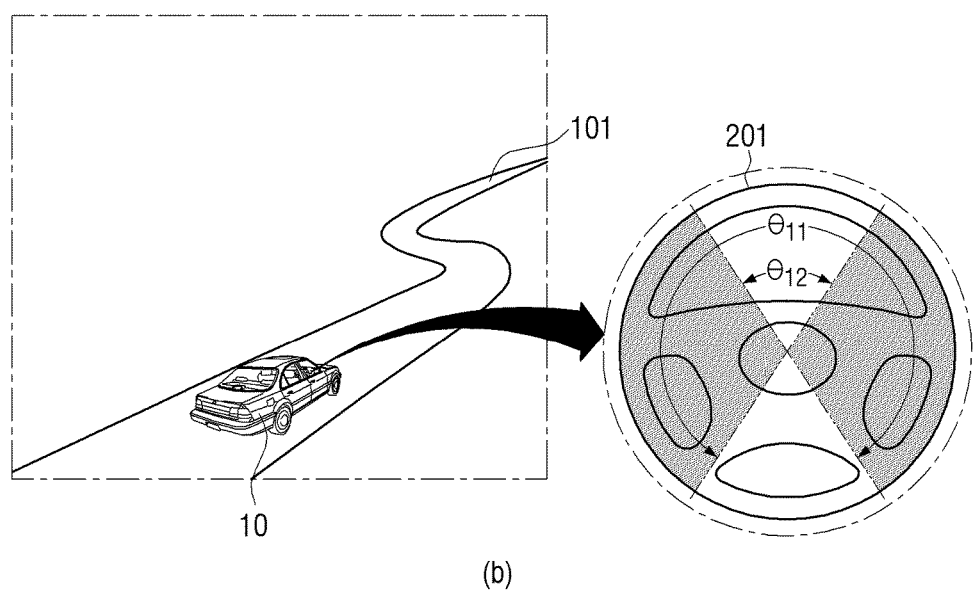
(b)

FIG. 3A
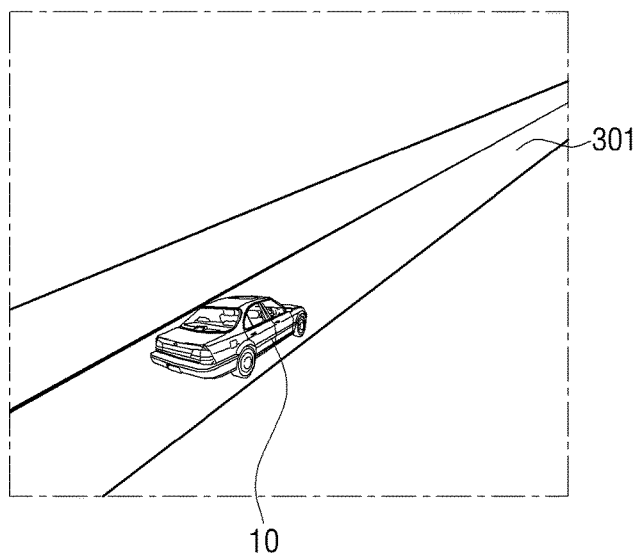
(a)
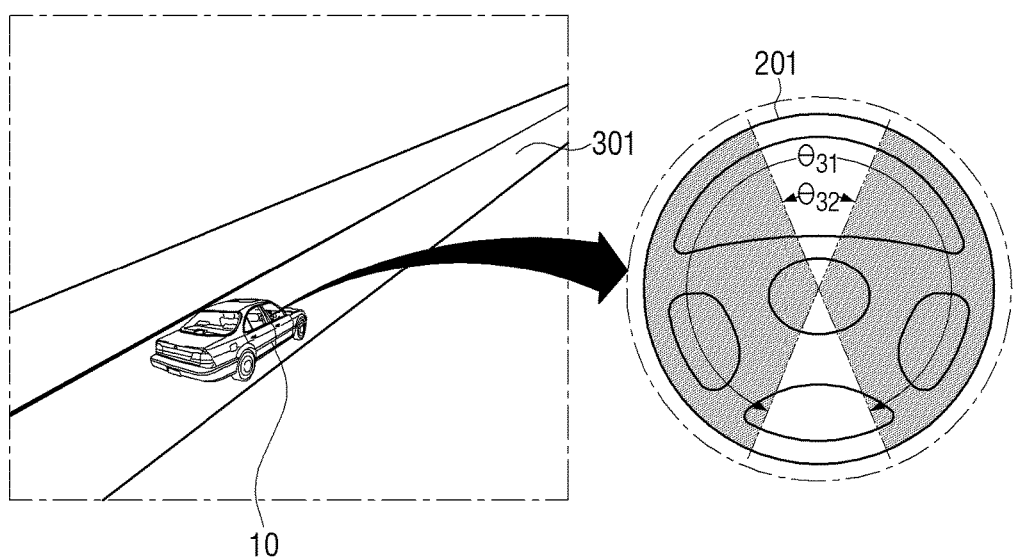
(b)

FIG. 4A
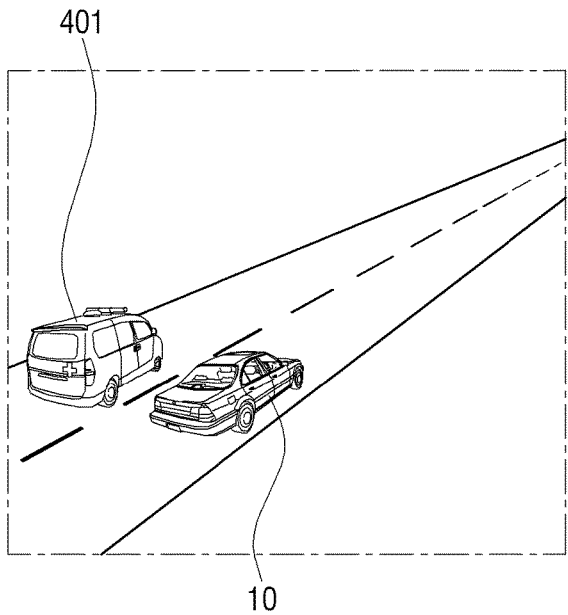
(a)
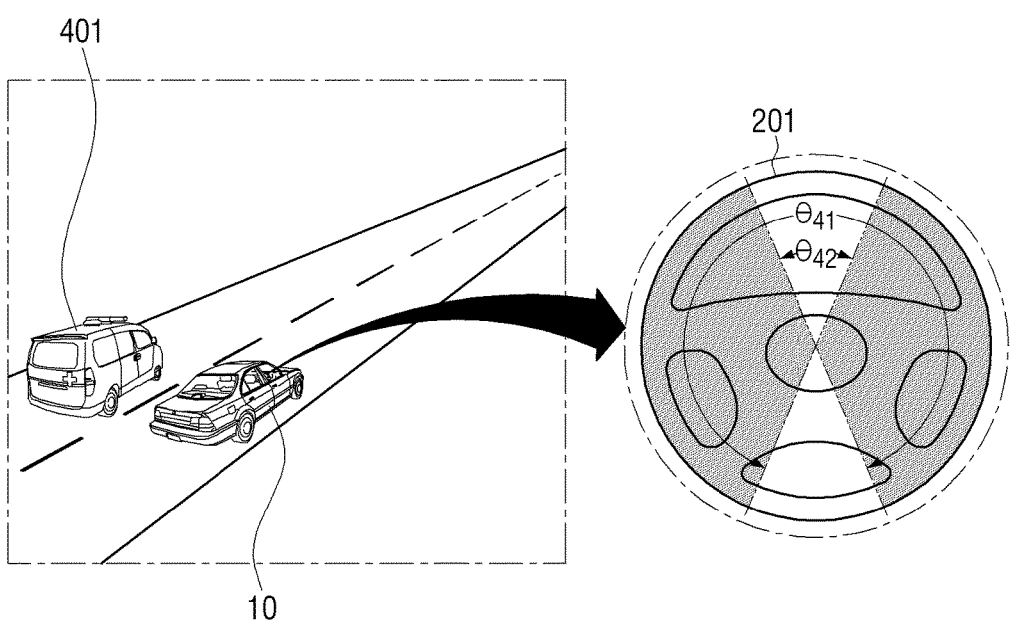
(b)

FIG. 5A
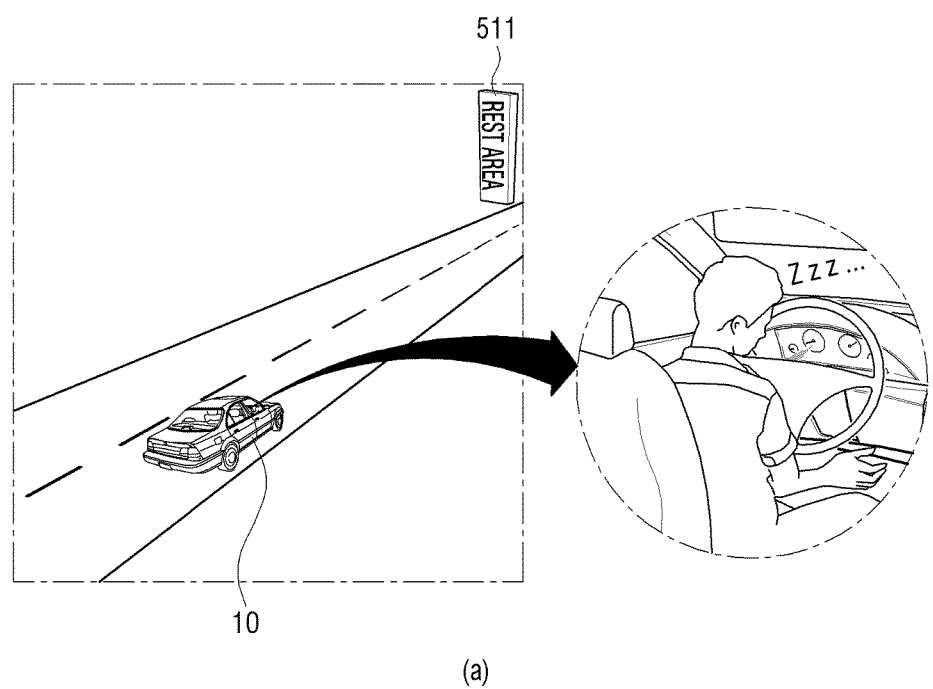
(a)
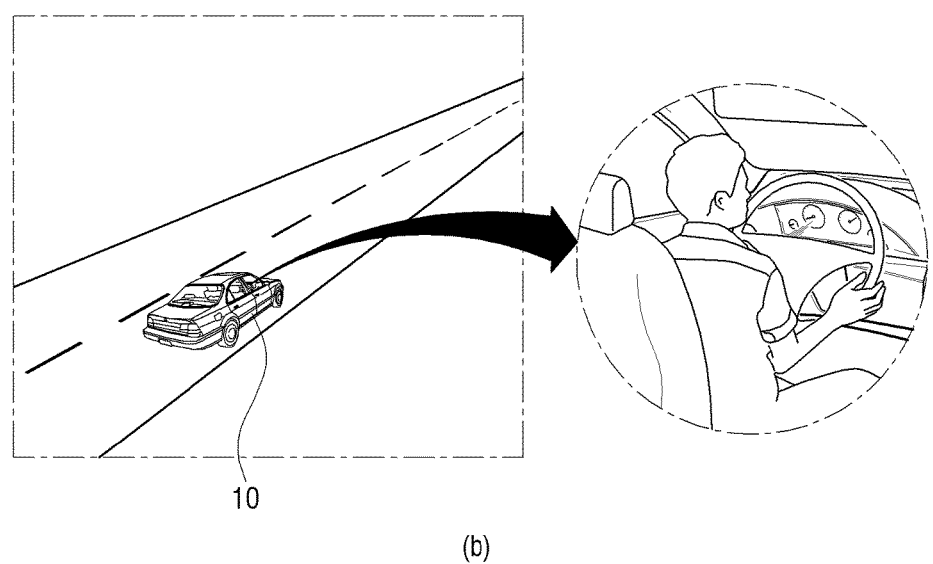
(b)

FIG. 6A
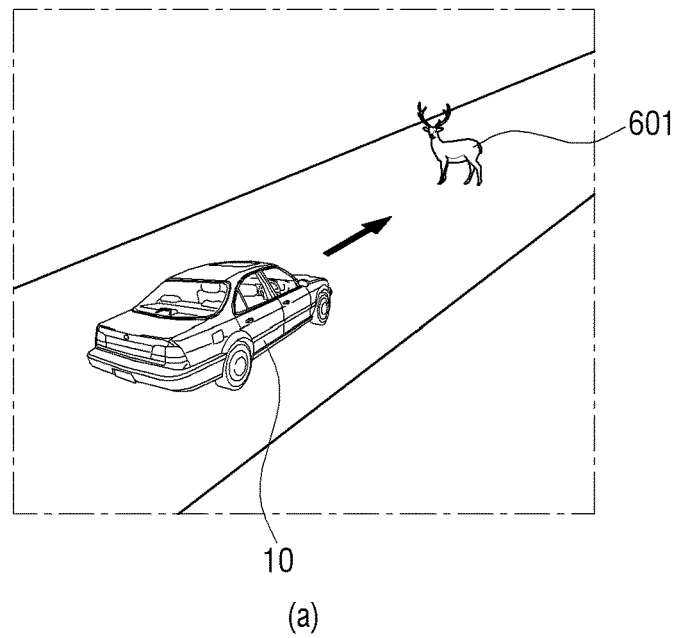
(a)
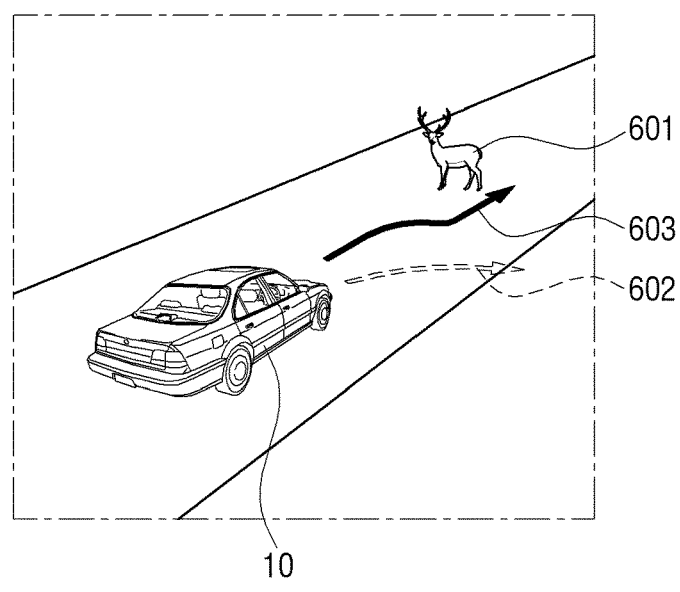
(b)

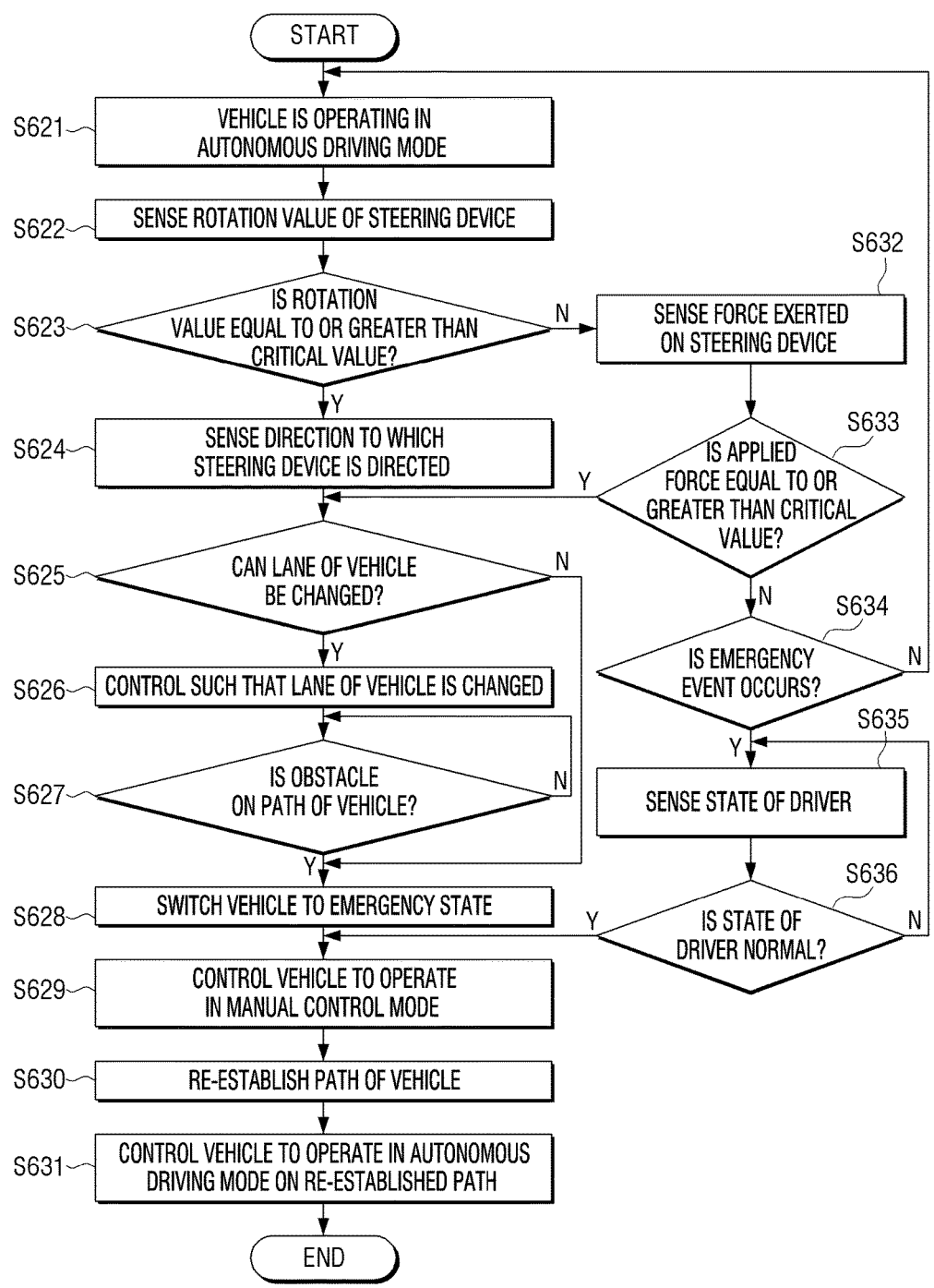

FIG. 7
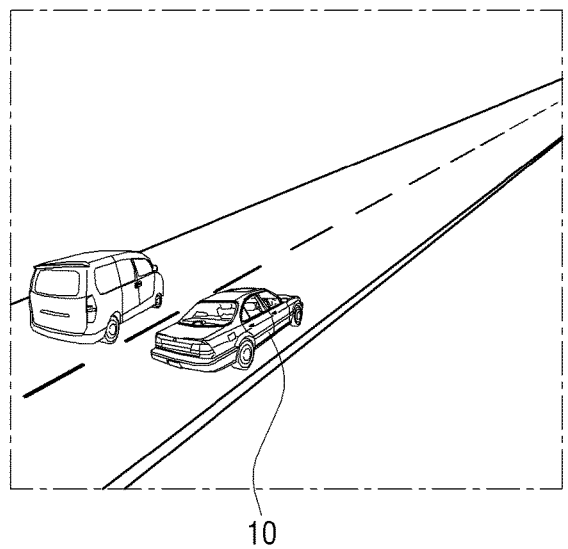
(a)
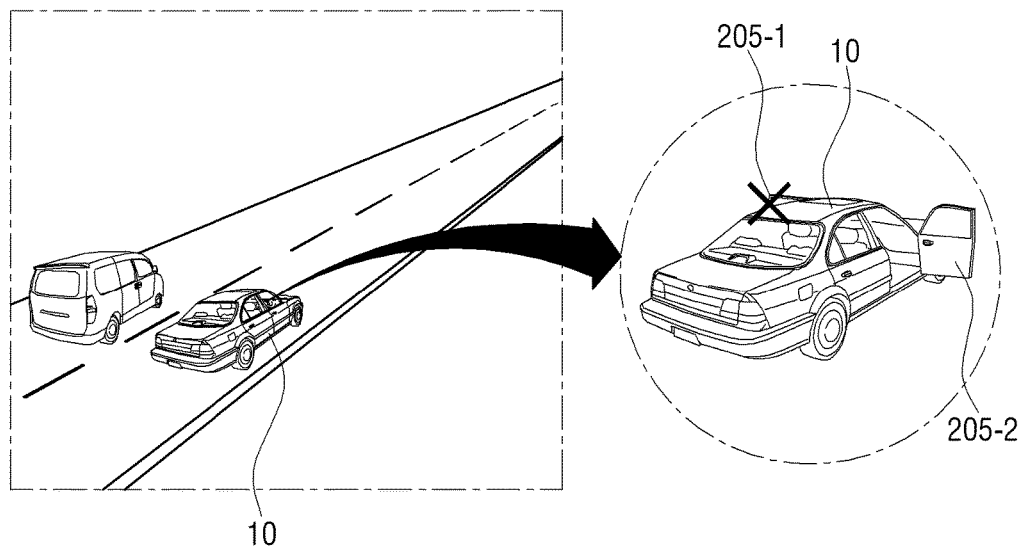
(b)

FIG. 8
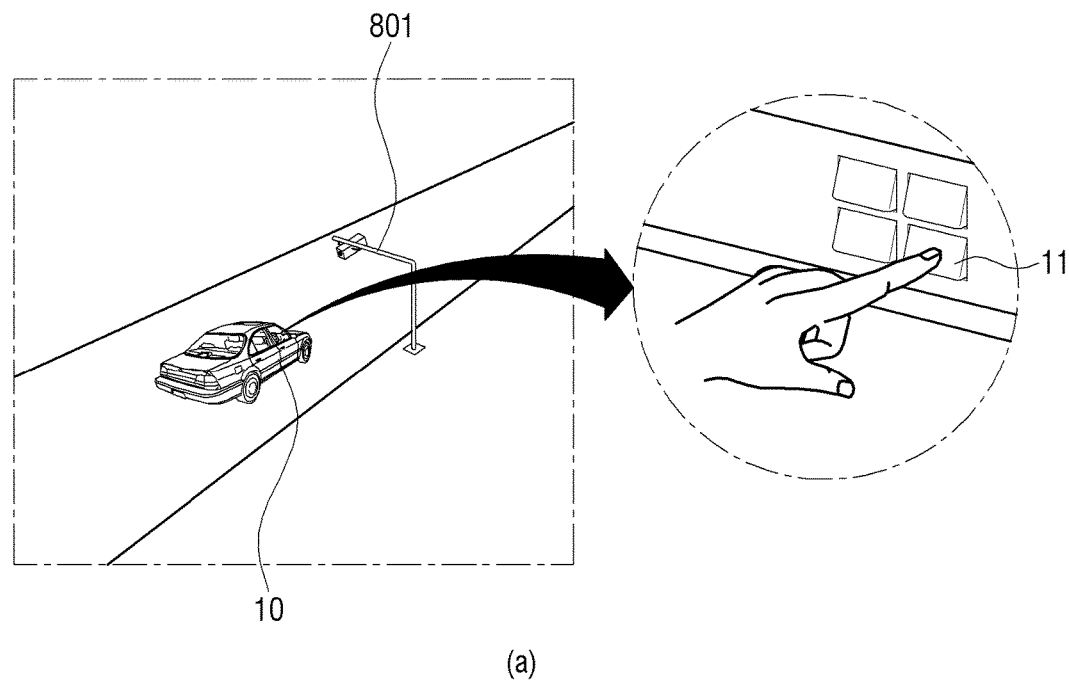
(a)
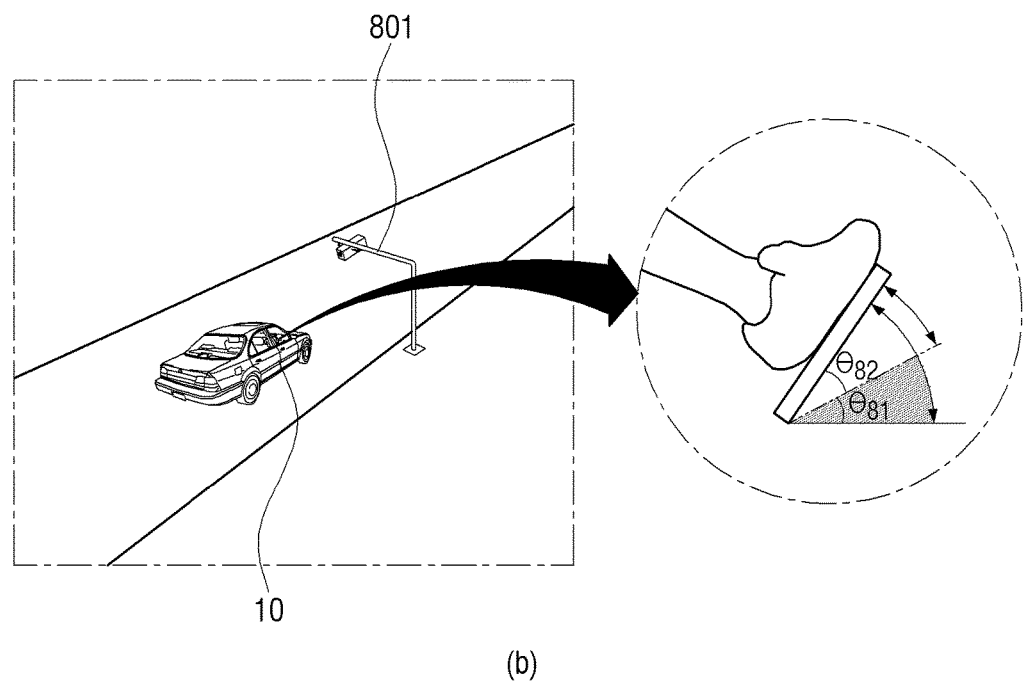
(b)

FIG. 9
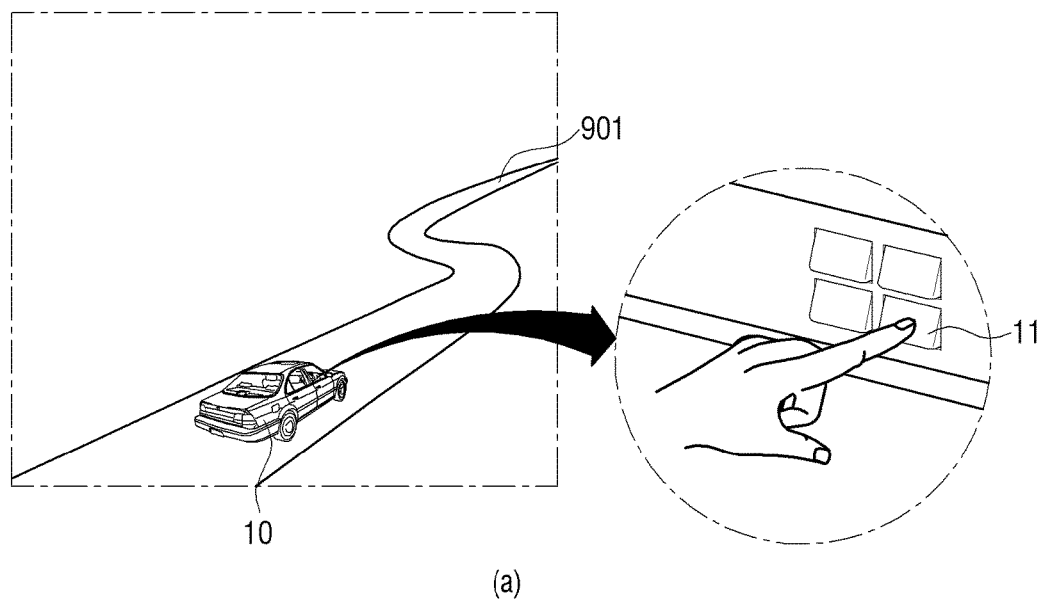
(a)
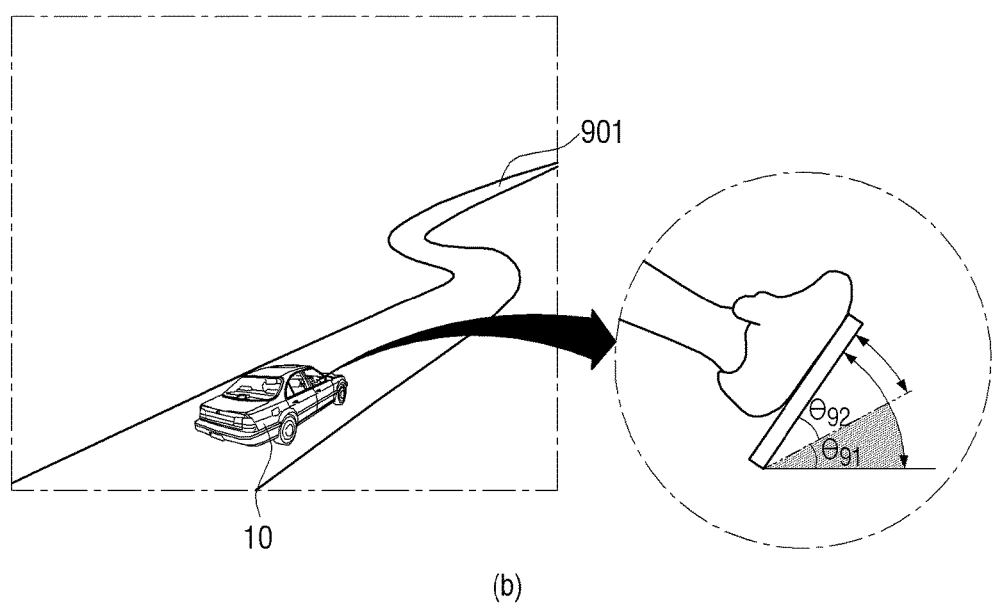
(b)

METHOD AND APPARATUS FOR CONTROLLING VEHICLE

PRIORITY

This application claims priority under 35 U.S.C. § 119(a) to Korean Patent Application No. 10-2016-0015478, filed in the Korean Intellectual Property Office on Feb. 11, 2016, the content of which is incorporated herein by reference.

BACKGROUND

1. Field of the Disclosure

The present disclosure relates generally to controlling apparatuses and methods relating to a vehicle, and more particularly, to a method and an apparatus for controlling a vehicle to operate in an autonomous driving mode or a manual driving mode.

2. Description of the Related Art

Various functions that enhance driver convenience are mounted on a vehicle.

For example, an automatic steering function may be provided that automatically steers the vehicle.

The automatic steering function originated from related electronic power steering (EPS), and has advanced to a level that includes a lane keeping assist system (LKAS), which surpasses simple steering supports.

When a vehicle is selectively switched between the autonomous driving mode and a manual driving mode, a driver driving the vehicle may have a difficulty adapting to the change in the controlled object of the vehicle.

For example, while a vehicle is driven in the autonomous driving mode, the vehicle may transition to the manual driving mode in response to the driver's selection or an urgent situation. Under the above circumstances, a driver may require time to adapt to driving the vehicle or to manipulate a steering device or a pedal.

Further, while a vehicle is driven in the manual driving mode, the vehicle may transition to the autonomous driving mode in response to the driver's selection or an urgent situation. Under the above circumstances, the vehicle is required to drive in the autonomous driving mode in consideration of the driving situation of the vehicle, such that driver convenience is increased.

SUMMARY

An aspect of the present disclosure provides a method and an apparatus for controlling a vehicle to operate in an autonomous driving mode or a manual driving mode.

According to an embodiment of the present disclosure, a method of a controller is provided for controlling a vehicle. The vehicle is controlled to operate in an autonomous driving mode in which the vehicle is driven without a manipulation by an operator of the vehicle. A request to switch to a manual driving mode, in which the vehicle is driven with the manipulation by the operator, is received. A range of the manipulation regarding a function of the vehicle is determined according to a driving situation of the vehicle in response to the request. The vehicle is controlled to operate in the manual driving mode in which the manipulation by the operator is limited according to the range of the manipulation.

According to another embodiment of the present disclosure, a method of a controller is provided for controlling a vehicle. The vehicle is controlled to operate in a manual driving mode in which the vehicle is driven by a manipulation of an operator. A request to switch to an autonomous driving mode, in which the vehicle is driven without the manipulation of the operator, is received. An intention of the operator is determined according to a driving situation of the vehicle. The vehicle is controlled to operate in the autonomous driving mode, which is established according to the intention of the operator.

According to another embodiment of the present disclosure, a controller is provided for controlling a vehicle. The controller includes a mode switch receiver configured to receive a request to switch to a manual driving mode, in which the vehicle is driven with a manipulation by an operator of the vehicle, while the vehicle is operating in an autonomous driving mode, in which the vehicle is driven without the manipulation by the operator. The controller also includes a driving state determiner configured to determine a range of the manipulation regarding a function of the vehicle according to a driving situation of the vehicle in response to the request. The controller further includes a driving mode controller configured to control the vehicle to operate in the manual driving mode in which the manipulation by the operator is limited according to the range of the manipulation.

According to another embodiment of the present disclosure, a method of a controller is provided for controlling a vehicle. A driving situation of the vehicle is determined with respect to at least one of a road on which the vehicle is driven, surrounding vehicles, a state of an operator of the vehicle, and a manipulation of a steering device of the vehicle. A driving mode is selected from a first manual driving mode in which manipulation by the operator is limited, a second manual driving mode in which the manipulation by the operator is not limited, and an autonomous driving mode in which the vehicle is automatically driven without the manipulation by the operator, based on the driving situation of the vehicle. The vehicle is controlled to operate in the selected driving mode.

BRIEF DESCRIPTION OF THE DRAWINGS

The above and/or other aspects, features, and advantages of the present disclosure will be more apparent from the following detailed description when taken in conjunction with the accompanying drawings, in which:

FIG. 1 is a diagram illustrating a scenario in which a controller controls a vehicle, according to an embodiment of the present disclosure;

FIG. 3A is a diagram illustrating a scenario in which a controller controls the vehicle, according to an embodiment of the present disclosure;

FIG. 4A is a diagram illustrating a scenario in which the controller controls the vehicle, according to an embodiment of the present disclosure;

FIG. 5A is a diagram illustrating a scenario in which the controller controls the vehicle, according to an embodiment of the present disclosure;

FIG. 6A is a diagram illustrating a scenario in which the controller controls the vehicle, according to an embodiment of the present disclosure;

FIG. 6C is a flowchart illustrating a process in which the controller of FIG. 6A controls the vehicle, according to an embodiment of the present disclosure;

FIGS. 7 to 9 are diagrams illustrating scenarios in which the controller controls a vehicle, according to an embodiment of the present disclosure;

DETAILED DESCRIPTION

Figure 2A:
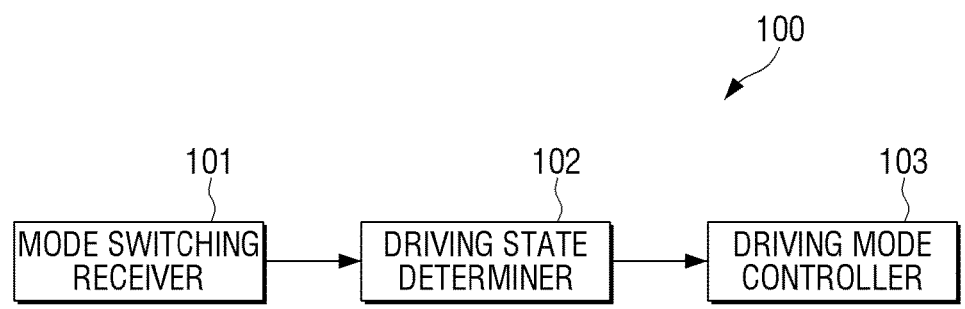
FIG. 2A is a block diagram illustrating a controller that controls a vehicle, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Expressions such as "have", "may have", "include", and "may include", as used herein, refer to the presence of a corresponding characteristic (e.g., an element such as a number, a function, an operation, or a component), and do not prohibit the presence of at least one additional characteristic.

Expressions such as "A or B", "at least one of A or/and B", and "one or more of A or/and B", as used herein, may encompass every available combination of the items that are listed together. For example, the expressions "A or B", "at least one of A and B" or "one or more of A and B" may refer to: (1) including at least one A; (2) including at least one B; or (3) including both at least one A and at least one B.

Expressions such as "first", "second", and so on may modify a variety of elements irrespective of their order and/or importance, and are used only to distinguish one element from another, but are not intended to limit the corresponding elements.

When a certain element (e.g., first element) is described as being operatively or communicatively coupled with/to, or connected to another element (e.g., second element), it is to be understood that the certain element may be directly coupled with/to the other element or coupled via yet another element (e.g., third element). In contrast, when a certain element (e.g., first element) is stated as being "directly coupled" with/to or "directly connected" to another element (e.g., second element), it is to be understood that there is no other element (e.g., third element) present between the certain element and the other element.

The expression "configured to", as used herein, is interchangeable with "suitable for", "having the capacity to", "designed to", "adapted to", 'made to", and" capable of", depending on the circumstances. The expression "configured to" may not necessarily refer to "specifically designed to" on a hardware level. Instead, in certain circumstances, the expression "apparatus configured to" may mean that the apparatus "is capable of" with another apparatus or component. For example, a phrase "a processor configured to perform A, B and C" may refer to a devoted processor, such as an embedded processor, to perform corresponding operations, or a generic-purpose processor, such as central processing unit (CPU) or application processor (AP), that is capable of performing corresponding operations by implementing one or more software programs stored on a memory device.

Herein, terms are used to describe specific embodiments and are not intended to limit the scope of another exemplary embodiment. A singular expression, unless otherwise specified, may encompass a plural expression. The terms used herein, including technical or scientific terminology, may have the same meanings as those generally understood by those skilled in the art described herein. Those terms used herein and defined in the dictionary may be interpreted in the same or similar context as used in the related technologies, and unless otherwise specified herein, these will not be interpreted as an ideal or excessively formal meaning. Terms defined herein may not be interpreted in a manner that excludes embodiments of the present disclosure.

According to an embodiment, an autonomous driving mode may indicate a mode in which a vehicle is driven automatically without requiring intervention of a driver (e.g. vehicle passenger seated in driver's position, or vehicle operator). The autonomous driving mode may be referred to as an automatic driving mode. Further, according to an embodiment, a manual driving mode may indicate a mode in which a vehicle is driven manually with the manipulation of a driver. Further, according to an embodiment, a semi-autonomous driving mode may indicate that a vehicle is operating according to the manual driving mode in which the manipulation of a driver is partly limited. The semi-autonomous driving mode may be referred to as a semi-automatic driving mode or semi-manual driving mode.

According to an embodiment, a controller may be a part of a vehicle or an external device mounted on a vehicle.

When the controller is a part of a vehicle, the controller may be an advanced driving aiding system such as an advanced driver assist system (ADAS) or a part of the above-described system. Further, the controller may be an electronic controlling device such as electronic control unit (ECU) that electronically controls various functions related with the driving of a vehicle, or part of the above-described device.

When the controller is an external device mounted on a vehicle, the controller may be a driving aiding device such as on board diagnostics (OBD) connected to a vehicle connector (e.g., OBD component, OBD connector, and so on), global positioning system (GPS), and so on, or a part of the above-described devices.

In addition, the controller may be, or may be a part of, a portable phone apparatus, a smart phone, a tablet personal computer (PC), a mobile phone, a video telephone, an e-book reader, a desktop PC, a laptop PC, a netbook computer, a personal digital assistant (PDA), a portable multimedia player (PMP), an MP3 player, a mobile medical device, a camera, an internet of things device, and a wearable device.

According to an embodiment, a vehicle may be a device with a person or freight on board for moving the same. The vehicle may include a car, an airplane, a motorcycle, a ship, or a train, for example.

FIG. 1 is a diagram illustrating a scenario in which the controller controls a vehicle, according to an embodiment of the present disclosure.

Referring to FIG. 1A, a vehicle 10 may operate in the autonomous driving mode in which the vehicle is driven on a curved road 101 without the manipulation of a driver.

While the vehicle 10 is operating in the autonomous driving mode, the controller may receive a request to switch to the manual driving mode in which the vehicle is driven with the manipulation of a driver. For example, a user may press a manual switching button 11 provided on a dashboard of the vehicle 10.

Further, the controller may receive a switch request according to an event occurring based on a state of driver (e.g., at least one of the driver's hand position, foot position, body position, and face position), a switch request according to an event occurring based on an urgent situation of the vehicle 10, and a switch request occurring based on the surrounding environment of the vehicle 10.

A request to switch the vehicle 10 to the manual driving mode, according to the various methods described above, can be applied to all of the embodiments described below.

In response to the received switch request, the controller may determine a range of the driver's manipulation regarding one function among a plurality of driving functions necessary for driving the vehicle 10 according to the driving situation of the vehicle 10.

For example, the controller may determine a steering range that can be manipulated by a driver regarding a steering function of the vehicle 10 according to the degree of curve of the road where the vehicle 10 is driving. Specifically, the controller may obtain the curvature information of the road by referring to a map in which the vehicle is driven. The map of the road on which the vehicle 10 is driving may be stored in a memory of the vehicle 10 or may be received from a device (e.g., server or cloud server) external to the vehicle 10.

The controller may determine a rotation angle by which a steering device 201 provided on the vehicle 10 (e.g., a steering wheel) can be rotated by a driver, using the obtained curvature information of the road. Further, the controller may determine a steering range that can be manipulated by a driver, using at least one of lane information, guard rail degree, and other obstacle information of the road where the vehicle 10 is driving. Herein, determining a range of the driver's manipulation may indicate a range able to be manipulated by a driver or a range not able to be manipulated by a driver.

When a range that can be manipulated by a driver is determined, the controller may control the vehicle 10 to operate in the manual driving mode in which the driver's manipulation is partly limited, as illustrated in FIG. 1B. For example, the controller may control the vehicle 10 to operate in the manual driving mode in which the rotation angle of the steering device 201 is limited. For example, when a range of the rotation angle by which the steering device 201 of the vehicle 10 can rotate without limitation is $\theta_{11}$, the controller may control the vehicle 10 such that a range of the rotation angle by which the steering device 201 rotates can be $\theta_{12}$.

Thereby, when receiving a request to switch to the manual driving mode from the autonomous driving mode, the controller 100 may control the vehicle 10 to operate in the manual driving mode in which the driver's manipulation is partly limited for the driving safety of the vehicle 10.

Further, when receiving a request to switch to the autonomous driving mode from the manual driving mode, the controller 100 may control the vehicle 10 to operate in the autonomous driving mode in consideration of various autonomous driving parameters such as a state of the driver, a state of the vehicle, and a surrounding environment of the vehicle.

FIG. 2A is a block diagram illustrating the controller of the vehicle, according to an embodiment of the present disclosure.

Referring to FIG. 2A, a controller 100 includes a mode switching receiver 101, a driving state determiner 102, and a driving mode controller 103.

The mode switching receiver 101, the driving state determiner 102, and the driving mode controller 103 may be modules included in at least one processor. Further, the mode switching receiver 101, the driving state determiner 102, and the driving mode controller 103 may be collectively referred to as a processor.

The mode switching receiver 101, the driving state determiner 102, and the driving mode controller 103 may be distinguished according to their function, and a name of each unit can be different according to the implementation. Each unit may include a software module or a hardware module.

The mode switching receiver 101 may receive a request to switch to the manual driving mode in which the vehicle is driven with the driver's manipulation while the vehicle 10 is operating in the autonomous driving mode. Further, the mode switching receiver 101 may receive a request to switch to the autonomous driving mode in which the vehicle is driven without the driver's manipulation while the vehicle 10 is operating in the manual driving mode.

For example, the mode switching receiver 101 may receive a switch request according to the user manipulation of selecting a manual switching user interface (e.g., manual switching button) or automatic switching user interface (e.g., automatic switching button) provided on the vehicle 10 as switch request. Further, the mode switch receiver 101 may receive a switch request according to an event that is occurring based on the state of driver, the state of the vehicle, or the surrounding environment of the vehicle.

The driving state determiner 102 may determine a range of the driver's manipulation regarding one function among a plurality of the driving functions of the vehicle 10, according to the driving situation of the vehicle 10 in response to the switch request through the mode switching receiver 101.

For example, the driving state determiner 102 may determine a steering range that can be manipulated by a driver regarding the steering function of the vehicle 10 according to the degree of curve or the traffic regulations with respect to the road where the vehicle 10 is driving.

Further, the driving state determiner 102 may determine an acceleration range that can be manipulated by a driver regarding an acceleration function of the vehicle 10, according to the degree of curve or the traffic regulations of the road where the vehicle 10 is driving.

Further, the driving state determiner 102 may determine a steering range or an acceleration range that can be manipulated by a driver regarding the steering function of the vehicle 10, according to the state of another vehicle in a neighboring lane on the road.

According to an embodiment, when the driving state determiner 102 determines a steering range that can be manipulated by a driver, the driving state determiner 102 may determine a rotation angle by which the steering device provided on the vehicle 10 can be rotated by a driver. Further, when the driving state determiner 102 determines an acceleration range that can be manipulated by a driver, the driving state determiner 102 may determine a tilting angle by which the acceleration device provided on the vehicle 10 can be tilt or a velocity increase rate according to a gradient of the acceleration device.

The driving state determiner 102 may determine the intention of a driver who drives the vehicle 10 according to the driving state of the vehicle 10.

For example, the driving state determiner 102 may determine the intention of a driver who drives the vehicle 10 based on at least one of the state of driver, the state of the vehicle 10, and the surrounding environment of the vehicle 10. For example, when determining that the intention of a driver is to decrease the velocity of the vehicle, the driving mode controller 103 may control the vehicle 10 to operate in the autonomous driving mode in which the velocity is limited.

The driving mode controller 103 may control the vehicle 10 to operate in the manual driving mode or the autonomous driving mode according to the result determined in the driving state determiner 102.

For example, the driving mode controller 103 may control the vehicle 10 to operate in the manual driving mode in which the driver's manipulation is partly limited, according to the range of the manipulation determined in the driving state determiner 102.

Further, the driving mode controller 103 may control the vehicle 10 to operate in the autonomous driving mode, which is established according to the driver's intention determined in the driving state determiner 102.

Figure 2B:
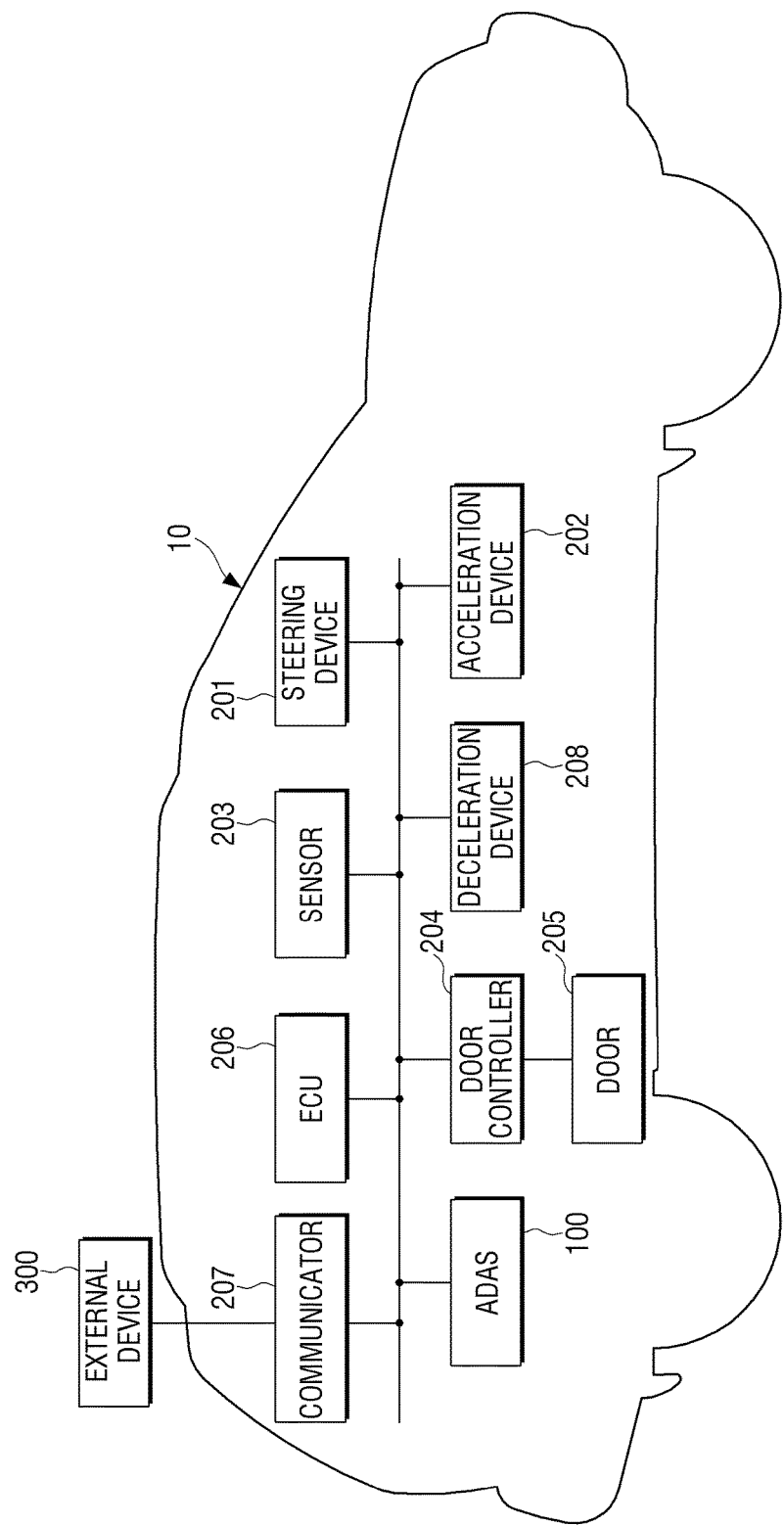
FIG. 2B is a block diagram illustrating a vehicle system including a controller, according to an embodiment of the present disclosure.

FIG. 2B is a block diagram of a system regarding the vehicle including the controller, according to an embodiment of the present disclosure.

Referring to FIG. 2B, the vehicle 10 may include an ADAS as one example of the controller 100, ECU 206 that performs the general control related with the driving of the vehicle 10 such as driving/braking/steering of the vehicle 10, a door controller 204 that controls a door of the vehicle 10, a door 205, a steering device 201 (e.g., wheel), an acceleration device 202 (e.g., acceleration pedal), a deceleration device 208 (e.g., brake pedal), a communicator 207, and a sensor 203.

Specifically, the ECU 206 may determine the fuel injection amount and the ignition time by sensing the state of the vehicle 10 such that an engine of the vehicle 10 is kept in order. For example, the ECU 206 may correct a water temperature sensor and an oxygen sensor, and may adjust the switching ratio of an injector based on manifold absolute pressure (MAP) of the ignition time and MAP of the fuel injection, which are previously established by considering a revolution number of the engine, suction air amount, suction pressure, and openness degree of the accelerator regarding the vehicle 10.

Further, the communicator 207 may perform communication with an external device 300 located externally from the vehicle 10 (e.g., a cloud server) by using a distant communication module or a near field communication module. When using the distant communication module, the communicator 207 may perform the communication with the external device 300 according to communication standards such as Institute for Electrical and Electronics Engineers (IEEE), $3^{rd}$ generation (3G), $3^{rd}$ generation partnership project (3GPP), long term evolution (LIE), and GPS. When using the near field communication module, the communicator 207 may perform communication with the external device 300 according to communication standards such as Wi-Fi, Bluetooth, Zigbee, Picocast, etc.

Further, when performing communication according to a wired communication method, the communicator 207 may use a 20-pin connector, a 16-pin connector, or a universal serial bus (USB) connector, for example. The communicator 207 may perform communication according to communication protocols such as on-board diagnosis version I (OBD-1), OBD-2, European on-board diagnosis (EOBD), Korean on-board diagnosis (KOBD), K-Line, RS-232, controller area network (CAN), etc.

The sensor 203 may sense the surrounding environment of the vehicle 10 or the situation of a driver who boards the vehicle 10. The sensor 203 may include an object sensor such as a Lidar sensor, a radar sensor, an ultrasound sensor, and a vision sensor in order to sense the surrounding environment of the vehicle 10. Herein, the surrounding environment of the vehicle 10 may indicate information regarding another vehicle positioned in the surrounding area of the vehicle 10 or information regarding a property or a person positioned near to the vehicle 10.

Further, the sensor 203 may include a noise sensor, a movement sensor, a video sensor, a touch sensor, etc., in order to sense the situation of a driver. Herein, the situation of a driver may indicate fatigue of a driver or driving posture of a driver. Specifically, driver fatigue may be determined by tracking the driver' gaze and the driver's facial movement.

In addition, the sensor 203 may further include at least one sensor among an acceleration sensor, a gyro sensor, an illumination sensor, a proximity sensor, a pressure sensor, a noise sensor (e.g., microphone), a video sensor (e.g., camera module), a temperature sensor, a shock sensor, and a timer.

According to an embodiment, the sensor 203 and the ECU 206 may be implemented to be part of the controller 100 or units separate from the controller 100. Further, a part of the sensor 203 and the ECU 206 may be implemented to be part of the controller 100. Further, according to an embodiment, the controller 100 sensing specific information (e.g., surrounding environment of the vehicle 10, the state of driver, and the state of the vehicle 10) may include receiving the sensing result through the sensor 203 or the ECU 206 provided separately from the controller 100 as well as directly sensing by the controller 100.

The vehicle 10 may further include a memory storing various programs and data for controlling the vehicle 10. According to an embodiment, at least part of the memory may be included in the controller 100 or in the ECU 206 of the vehicle 10. Further, the memory may be included in one area of the vehicle 10 or may be electrically connected to the controller 100.

The memory may include an internal memory or an external memory, for example. The internal memory may include at least one of a volatile memory (e.g., dynamic random access memory (RAM) (DRAM), static RAM (SRAM), synchronous dynamic RAM (SDRAM)), a non-volatile memory (e.g., one time programmable read only memory (ROM) (OTPROM), programmable ROM (PROM), erasable and programmable ROM (EPROM), electrically erasable and programmable ROM (EEPROM), mask ROM, flash ROM)), flash memory (e.g., NAND flash or NOR flash), hard drive, or solid state drive (SSD).

The external memory may further include a flash drive such as, for example, compact flash (CF), secure digital (SD), micro secure digital (Micro-SD), mini secure digital (Mini-SD), extreme digital (xD), multi-media card (MMC), or memory stick.

The program stored in the memory may be implemented to be software, firmware, hardware, or the combination of at least two among the above.

At least part of the program may be implemented by the controller 100 of the vehicle 10.

For example, the controller 100 may call the instruction of the program stored in the memory, and may receive a request to switch to the manual driving mode in which the vehicle is driven with the driver's manipulation while the vehicle 10 is operating in the autonomous driving mode, according to the calculation based on the called instruction.

In response to the received switch request, the controller 100 may determine a range of the driver's manipulation regarding one function among a plurality of the driving functions performed by the vehicle 10 according to the driving state of the vehicle 10, and may control the vehicle 10 to operate in the manual driving mode in which the driver's manipulation is partly limited according to the determined range of the manipulation.

Alternatively, the controller 100 may call the instruction of the program stored in the memory, and receive a request to switch to the autonomous driving mode in which the vehicle is driven without the driver's manipulation while the vehicle 10 is operating in the manual driving mode according to the calculation based on the called instruction.

In response to the received switch request, the controller 100 may determine the intention of a driver who drives the vehicle 10 according to the driving state of the vehicle 10, and control the vehicle 10 to operate in the autonomous driving mode which is established according to the determined intention of a driver.

Referring back to FIG. 2B, the vehicle 10 may operate in the autonomous driving mode, for example.

Under the above-described circumstance, when a driver selects the manual driving mode button, the ECU 206 may transmit the request signal for switching to the manual driving mode generated according to selecting the button to the ADAS 100.

The ADAS 100 may receive the request signal for switching to the manual driving mode, and determine the driving state of the vehicle 10 based on the values sensed in the sensor 203. Further, the ADAS 100 may determine a range of the driver's manipulation regarding one function among a plurality of the driving functions performed by the vehicle 10 according to the determined driving state.

For example, the ADAS 100 may obtain a map from the external device 300 (e.g., cloud) through the communicator 207 in order to determine a manipulation range. Further, the ADAS 100 may obtain a map from the memory of the vehicle 10. The map may be a high-precision map. The high-precision map may be map in which information regarding the roads may be recorded on a centimeter basis. The high-precision map may include various pieces of information such as lane information of the road where the vehicle 10 is driving, traffic regulation information, and curve and tilt road information.

The ADAS 100 may determine a manipulating angle of the steering device 201 as range of the driver's manipulation by considering the road state (e.g., degree of curve or road surface state) with the obtained map.

According to the determined range of the manipulation, ADAS 100 may transmit signals to control the vehicle 10 to operate in the manual driving mode, in which the driver's manipulation is partly limited, to the ECU 206. When the ECU 206 receives the control signals, it may operate the vehicle 10 in the manual driving mode in which the manipulation of the steering device 201 is partly limited.

FIG. 3A is a diagram illustrating a scenario in which the controller controls the vehicle, according to an embodiment of the present disclosure.

Referring to (a) of FIG. 3A, the controller 100 may receive a request to switch to the manual driving mode while the vehicle 10 is operating in the autonomous driving mode.

In response to the received switch request, the controller 100 may determine a steering range that can be manipulated by a driver regarding the steering function of the vehicle according to the traffic regulations of the road where the vehicle 10 is driving. For example, the controller 100 may determine whether to change a lane 301 where the vehicle 10 is driving based on the traffic regulations of the lane 301. When the vehicle 10 cannot change the lane 301 (e.g., the vehicle is driven within a solid line lane), the controller 100 may determine a steering range that can be manipulated by a driver regarding the steering function of the vehicle 10.

When a steering range is determined, the controller 100 may control the vehicle 10 to operate in the manual driving mode in which the steering range is limited, as illustrated in (b) of FIG. 3A.

For example, the controller 100 may control the vehicle 10 to operate in the manual driving mode in which the rotation angle of the steering device 201 is limited. Specifically, when a range of the angle by which the steering device 201 of the vehicle 10 can rotate without the limitation is $\theta_{31}$, the controller 100 may control the vehicle 10 such that a range of the rotation angle by which the steering device 201 rotates can be $\theta_{32}$.

Figure 3B:
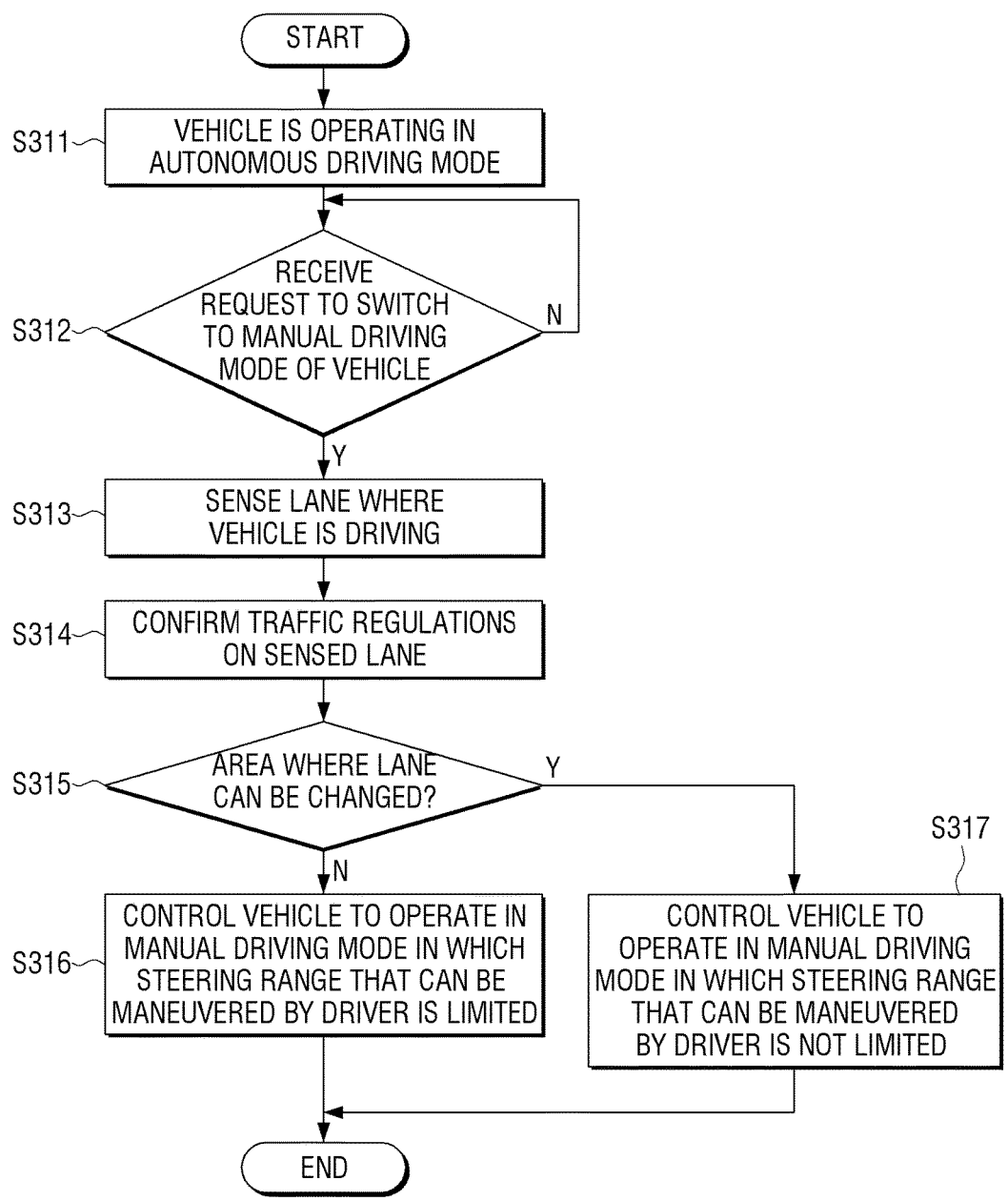
FIG. 3B is a flowchart illustrating a process in which the controller of FIG. 3A controls the vehicle, according to an embodiment of the present disclosure.

FIG. 3B is a flowchart illustrating a process in which the controller 100 controls the vehicle 10, according to an embodiment of the present disclosure with respect to FIG. 3A.

Referring to FIG. 3B, the vehicle 10 operates in the autonomous driving mode, in step S311.

It is determined whether the controller 100 receives a request to switch to the manual driving mode of the vehicle 10, in step S312.

When the switch request is received, the controller 100 determines a steering range that can be manipulated by a driver regarding the steering function of the vehicle 10 according to the traffic regulations of the path where the vehicle 10 is driving.

Specifically, the controller 100 senses the lane where the vehicle 10 is currently driving, in step S313.

The controller 100 confirms the traffic regulations on the sensed lane, in step S314.

For example, the controller 100 may obtain information regarding the map and the traffic regulations related to the lane sensed by the vehicle 10. The information regarding the map and the traffic regulations may be obtained from the memory or the external device 300 (e.g., a server, a cloud server, navigation integrated with, or mounted externally to the vehicle 10). The controller 100 may confirm whether the lane where the vehicle 10 is driving is a solid line lane or whether the local area where the vehicle 10 is driving is a U-turn prohibition area by using the obtained information.

Based on the sensed lane and the traffic regulations on the sensed lane, the controller 100 determines whether the vehicle 10 is positioned in an area where a lane can be changed, in step S315.

When the vehicle 10 is positioned in an area where a lane cannot be changed, the controller 100 controls the vehicle 10 to operate in the manual driving mode in which a steering range that can be manipulated by a driver is limited, in step S316. For example, the controller 100 may limit a steering range that can be manipulated by a driver such that the vehicle 10 cannot be moved out of the solid line.

When the vehicle 10 is positioned in an area where a lane can be changed, the controller 100 controls the vehicle 10 to operate in the manual driving mode in which a steering range of the vehicle 10 is not limited, in step S317. Further, the controller 100 may control the vehicle 10 to operate in the manual driving mode in which a steering range that can be manipulated by a driver is limited but wider than the steering range that can be manipulated by a driver in step S316.

FIG. 4A is a diagram illustrating a scenario in which the controller controls the vehicle, according to another embodiment of the present disclosure.

Referring to (a) of FIG. 4A, the controller 100 may receive a request to switch to the manual driving mode while the vehicle 10 is operating in the autonomous driving mode.

In response to the received switch request, the controller 100 may determine a steering range that can be manipulated by a driver regarding the steering function of the vehicle 10 according to the state of another vehicle 401 in a neighboring lane. For example, the controller 100 may determine whether the other vehicle 401 in the neighboring lane is positioned within a certain distance from the vehicle 10. When the other vehicle 401 is positioned within certain distance from the vehicle 10, the controller 100 may determine a steering range that can be manipulated by a driver regarding the steering function of the vehicle 10. Further, the controller 100 may determine the crash possibility by using the information of the velocity and the distance regarding the other vehicle 401. When the crash possibility is less than a preset value, the controller 100 may determine a steering range that can be manipulated by a driver regarding the steering function of the vehicle 10.

When a steering range is determined, the controller 100 may control the vehicle 10 to operate in the manual driving mode in which a steering range is limited, as illustrated in (b) of FIG. 4A.

For example, the controller 100 may control the vehicle 10 to operate in the manual driving mode in which a rotation angle of the steering device 201 is limited. Specifically, when an angle by which the steering device 201 of the vehicle 10 can rotate without the limitation is $\theta_{41}$, the controller 100 may control the vehicle 10 such that a rotation angle by which the steering device 201 rotates can be $\theta_{42}$.

Further, the controller 100 may control the vehicle 10 to operate in the manual driving mode in which an acceleration range of the vehicle 10 is limited. For example, the controller 100 may control the vehicle 10 to operate in the manual driving mode in which an acceleration range of the acceleration device 202 is limited.

Figure 4B:
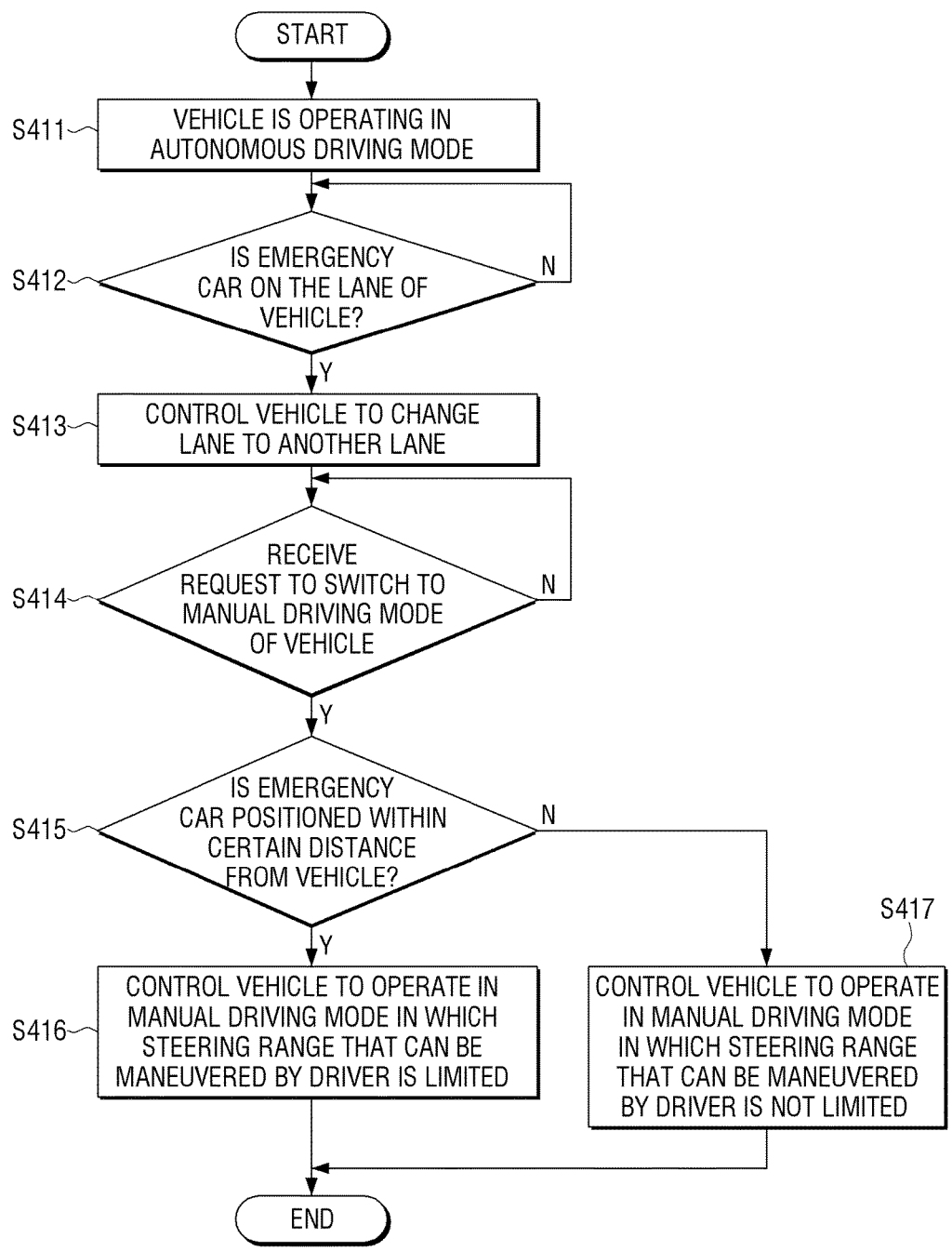
FIG. 4B is a flowchart illustrating a process in which the controller of FIG. 4A controls the vehicle, according to an embodiment of the present disclosure.

FIG. 4B is a flowchart illustrating a process in which the controller controls the vehicle, according to an embodiment of the present disclosure with respect to FIG. 4A.

Referring to FIG. 4B, the vehicle 10 operates in the autonomous driving mode, in step S411.

The controller 100 may sense whether there is another vehicle on the path of the vehicle 10.

Specifically, the controller 100 determines whether there is an emergency car (e.g., patrol car or ambulance) in the lane of the vehicle 10, in step S412.

When there is an emergency car in the path of the vehicle 10, the controller 100 controls the vehicle 10 to change to another lane, in step S413.

Under the above circumstance, the controller 100 determines whether a request to switch to the manual driving mode is received, in step S414.

When a switch request is received, the controller 100 determines a steering range that can be manipulated by a driver regarding the steering function of the vehicle 10, according to the state of the neighboring lane.

Specifically, the controller 100 determines whether an emergency car is positioned within a certain distance (e.g., 10 m) from the vehicle 10, in step S415.

When an emergency car is positioned within a certain distance from the vehicle 10, the controller 100 controls the vehicle 10 to operate in the manual driving mode in which a steering range that can be manipulated by a driver is limited, in step S416. For example, the controller 100 may limit a steering range that can be manipulated by a driver such that the vehicle 10 may not violate the neighboring lane.

When an emergency car is positioned out of a certain distance from the vehicle 10, the controller 100 controls the vehicle 10 to operate in the manual driving mode in which a steering range that can be manipulated by a driver is not limited, in step S417.

FIG. 5A is a diagram illustrating a scenario in which the controller controls the vehicle, according to another embodiment of the present disclosure.

Referring to (a) of FIG. 5A, the vehicle 10 may operate in the autonomous driving mode toward a destination 511. For example, when it is determined that the fatigue of a driver is too high, the controller 100 may control the vehicle 10 to designate the destination 511 to be a rest area and to operate in the autonomous driving mode.

Under the above circumstance, the controller 100 may receive a request to switch to the manual driving mode. For example, the controller 100 may receive a request to switch to the manual driving mode according to an event occurring based on the state of driver (e.g., the fatigue of a driver is reduced).

In response to the received switch request, the controller 100 may control the vehicle 10 in the manual driving mode, as illustrated in (b) of FIG. 5A. Further, the controller 100 may inform that the vehicle 10 is switched to the manual driving mode to a user. For example, the controller 100 may flicker the manual driving mode button of the vehicle 10 or generate alarm sounds. Thereby, a driver may control the vehicle 10 manually.

Figure 5B:
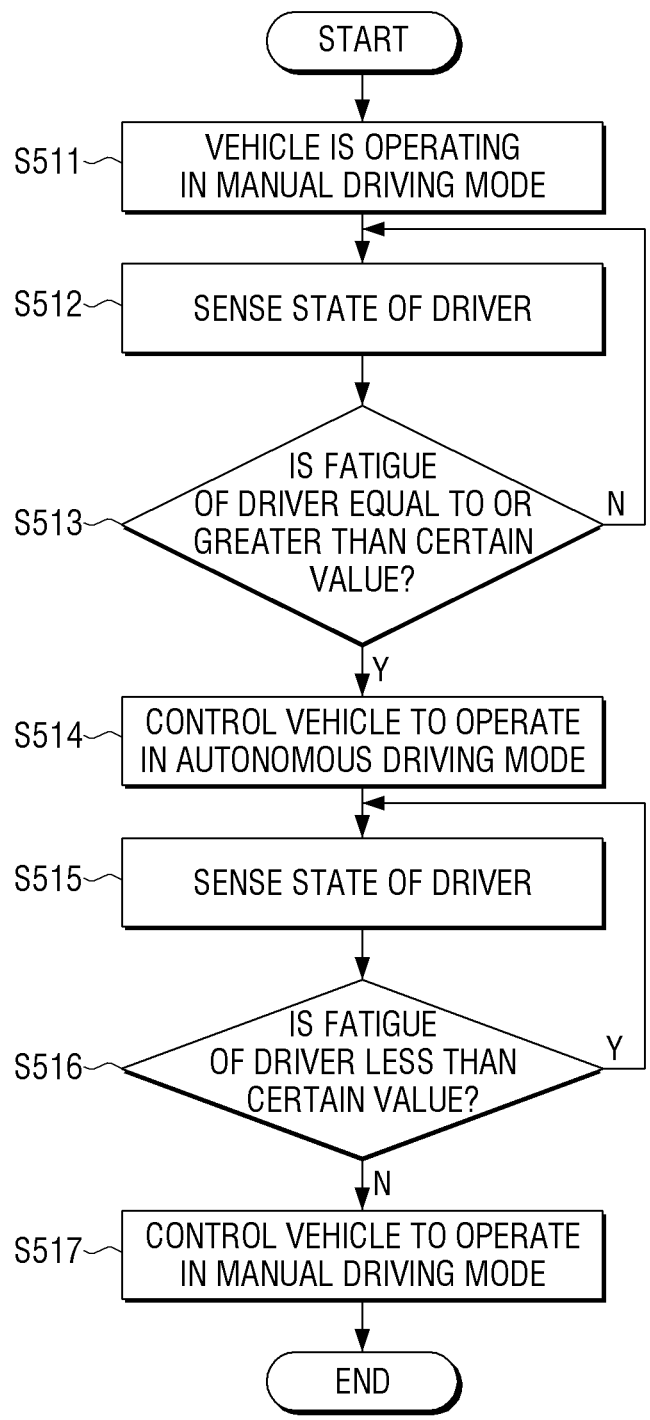
FIG. 5B is a flowchart illustrating a process in which the controller of FIG. 5A controls the vehicle, according to an embodiment of the present disclosure.

FIG. 5B is a flowchart illustrating a process in which the controller 100 controls the vehicle 10, according to the embodiment of the present disclosure with respect to FIG. 5A.

Referring to FIG. 5B, the vehicle 10 operates in the manual driving mode, in step S511.

The controller 100 senses a situation (e.g., fatigue) of a driver of the vehicle 10, in step S512. For example, the sensor 203 of the vehicle 10 may sense driver fatigue based on the activity pattern of a driver (e.g., eye blinking, head shaking).

Based on the sensed fatigue, the controller 100 determines whether the fatigue of the driver is greater than or equal to a certain value, in step S513.

When the fatigue of a driver is greater than or equal to the certain value, the controller 100 controls the vehicle 10 to operate in the autonomous driving mode, in step S514.

Herein, the controller 100 may change a destination or a path where the vehicle 10 is driving. The changed destination may be a nearby rest area or local area where a driver can take some rest and the vehicle can be parked.

When the fatigue of a driver is less than the certain value at S513-N, the controller 100 returns to step S512 and continues to sense the driver fatigue.

Even when the vehicle 10 is operating in the autonomous driving mode, the controller 100 continues to sense the state of driver (e.g., driver fatigue), in step S515.

Based on the sensed fatigue, the controller 100 determines whether the fatigue of a driver who drives the vehicle 10 is less than a certain value, in step S516. Here, 'CERTAIN VALUE' of S516 is different from 'CERTAIN VALUE' of S513. However, the present disclosure is not limited thereto, and depending on the intention of the developer of 'CERTAIN VALUE', 'CERTAIN VALUE' of S516 may be same as the 'CERTAIN VALUE' of S513.

When the driver fatigue is not less than the certain value, the controller 100 receives a request to switch to the manual driving mode regarding the vehicle 10. In response to the received switch request, the controller 100 controls the vehicle 10 to operate in the manual driving mode again, in step S517.

When the driver fatigue is less than the certain value at S516-N, the controller 100 returns to step S515 and continues to sense the driver fatigue.

FIG. 6A is a diagram illustrating a scenario in which the controller controls the vehicle, according to another embodiment of the present disclosure.

While the vehicle 10 is operating in the autonomous driving mode, a situation may occur in which a driver unexpectedly wants to manipulate the vehicle 10.

The situation may occur when a driver wants to manually change a driving path because there is an obstacle, which cannot be sensed by the sensor 203 of the vehicle 10 (e.g., object sensor), that appears, or when a driver is trying to open the door of the vehicle 10 while the vehicle 10 temporarily stops.

In order to respond to the urgent situation, the controller 100 may control the vehicle 10 to partly operate in the autonomous driving mode.

Referring to (a) of FIG. 6A, the controller 100 may sense the manipulation of a driver who recognizes the emergent situation while the vehicle 10 is operating in the autonomous driving mode. For example, the controller 100 may rotate the steering device 201 abnormally or sense the manipulation of a driver who puts a force on the steering device 201 in order to avoid the obstacle 601 and to suddenly change the currently driving path. Further, the controller 100 may sense the user inputting to select an emergent situation button provided on a dash board of the vehicle 10. Herein, the emergent situation button may include the manual driving mode button provided for selecting so as to quickly switch to the manual driving mode from the autonomous driving mode as well as emergent buttons provided separately.

When sensing the driver's manipulation to manipulate the steering device 201 abnormally, the controller 100 may determine the urgent situation in which the sensor 203 cannot sense the obstacle 601.

Next, as illustrated in (b) of FIG. 6A, the controller 100 may control the vehicle 10 to partly operate in the autonomous driving mode in which the vehicle 10 provides a new path 603 by considering path 602 of a driver to avoid the obstacle 601. Thus, the controller 100 may control the vehicle 10 to avoid the obstacle 601 such that a driver can drive toward the optimized safe path 603.

According to another embodiment, the controller 100 may control the vehicle 10 to operate in the manual driving mode until the controller 100 generates a new path under the urgent situation by sensing the state of driver.

Figure 6B:
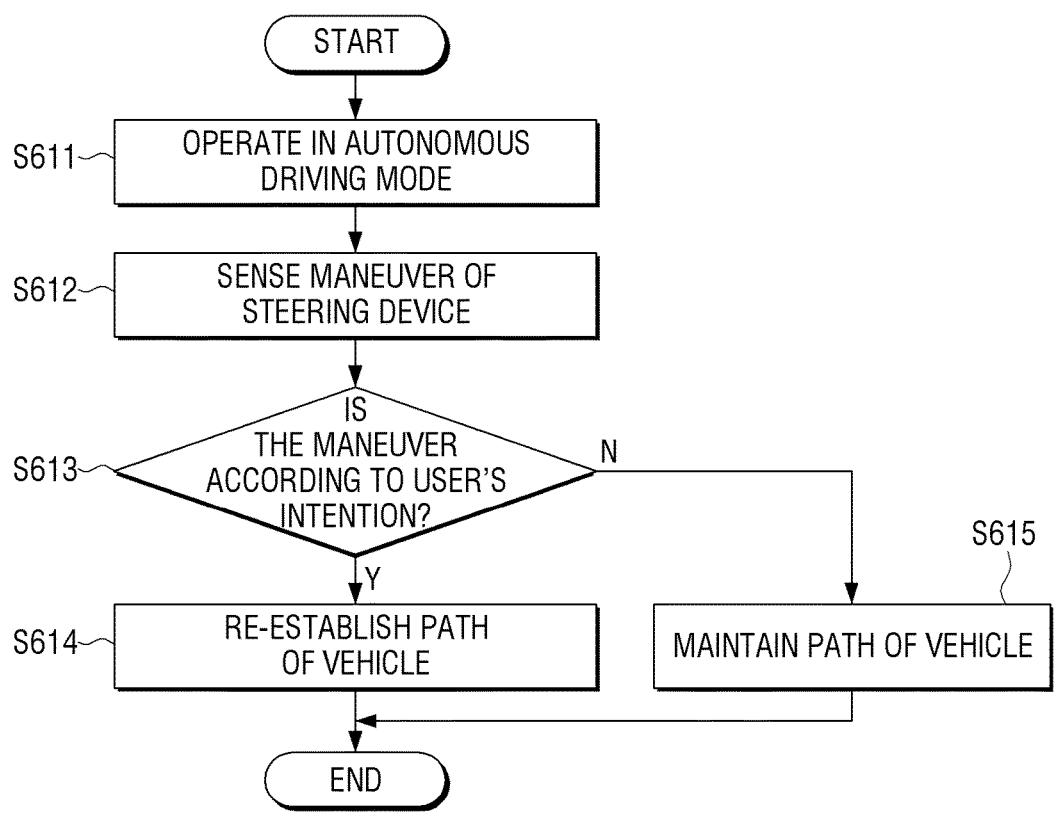
FIG. 6B is a flowchart illustrating a process in which the controller of FIG. 6A controls the vehicle, according to an embodiment of the present disclosure.

FIG. 6B is a flowchart illustrating a process in which the controller controls the vehicle, according to an embodiment of the present disclosure with respect to FIG. 6A.

Referring to FIG. 6B, the vehicle 10 operates in the autonomous driving mode, in step S611.

The vehicle 10 senses a manipulation of the steering device 201 according to the driver's manipulation, in step S612.

When the manipulation on the steering device 201 is sensed, the vehicle 10 determines whether the manipulation on the steering device 201 is performed according to the user's intention at S613.

When the manipulation is performed according to the user's intention as a determining, the controller 100 re-establishes the driving path of the vehicle 10 to another path, in step S614.

Meanwhile, when the manipulation is not performed according to the user's intention at S613-N, the controller 100 may maintain the driving path of the vehicle 10 to be previous path, in step S615.

FIG. 6C is a flowchart illustrating describing a process in which the controller controls the vehicle, according to an embodiment of the present disclosure with respect to FIG. 6A.

Referring to FIG. 6C, the vehicle 10 operates in the autonomous driving mode at S621.

The controller 100 senses a rotation value of the steering device 201, in step S622. A rotation value may be at least one among the rotation velocity and the rotation force in which the steering device 201 rotates, for example.

In step S623, the controller 100 determines whether the sensed rotation value is greater than or equal to a critical value.

When the sensed rotation value is greater than or equal to a critical value, the controller 100 senses a direction to which the steering device 201 is directed, in step S624.

Further, the controller 100 determines whether the lane in which the vehicle 10 is driving can be changed toward a direction to which the steering device 201 is directed, in step S625.

When the lane of the vehicle 10 cannot be changed, the controller 100 switches the vehicle 10 to the emergency state, in step S628. For example, the controller 100 may flicker an emergency light of the vehicle 10, keep a safety device provided on the vehicle 10 to be ready, and quickly reduce the velocity of the vehicle 10.

When the lane of the vehicle 10 can be changed, the controller 100 controls such that the lane of the vehicle 10 can be changed toward a direction to which the steering device 201 is directed, in step S626. Further, the controller 100 determines whether there is an obstacle on the changed path of the vehicle 10, in step S627. When there is an obstacle, the controller 100 switches the vehicle 10 to the emergency state, in step S628.

When switched to the emergency state, the controller 100 controls the vehicle 10 to operate in the manual control mode until a new path is established in order to avoid the emergency situation, in step S629.

While the vehicle 10 is operating in the manual control mode, the controller 100 re-establishes the driving path in the autonomous driving mode of the vehicle 10 to another path, in step S630. In this case, the controller 100 may sense the curvature and the road surface state of the road on which the vehicle 10 is driving, and establish a new path where the vehicle 10 will drive based on the above-described sensing. Further, the controller 100 may establish a new path where the vehicle 10 will drive by using the information regarding the lane (e.g., solid line or center line) on the path of the vehicle 10 or the information regarding the guard rail.

When a new path is established, the controller 100 controls the vehicle 10 to operate in the autonomous driving mode on the re-established path, in step S631. Further, the controller 100 may control the vehicle 10 to operate continuously in the manual driving mode according to the user selection.

Referring back to step S623, when it is determined that the sensed rotation value of the steering device 201 is less than the critical value, the controller 100 senses the force exerted on the steering device 201 of the vehicle 10, in step S632. The applied force may be a force of the driver to strongly pull the steering device 201 toward the driver.

In step S633, it is determined whether the applied force is greater than or equal to a critical value. Here, 'CRITICAL VALUE' of S633 is different from 'CRITICAL VALUE' of S623. However, the present disclosure is not limited thereto, and depending on the intention of the developer of 'CRITICAL VALUE', 'CRITICAL VALUE' of S633 may be same as the 'CRITICAL VALUE' of S623. When the applied force is greater than or equal to the critical value, the controller 100 controls the vehicle 10 to operate in the autonomous driving mode on the re-established path by considering whether to change the lane of the vehicle 10, as described above with respect to steps S625 to S631.

When the applied force is less than the critical value, the controller 100 determines whether another emergency event occurs, in step S634. Another emergency event may occur according to the user selecting the emergency button on the dashboard of the vehicle 10.

When an emergency event does not occur, the controller 100 continues to operate in the autonomous driving mode and returns to step S621.

When an emergency event occurs, the controller 100 senses the state of driver, in step S635.

The controller 100 determines whether the state of driver is normal or abnormal based on the sensed state of driver, in step S636. The normal state of driver may indicate that positions regarding the hands and feet of the driver are placed in an ordinary position in the vehicle 10 (e.g., the foot position is center of the pedal, the angle of the two hands is within a certain range of the wheel). Meanwhile, the abnormal state of driver may indicate that positions regarding the hands and feet of the driver are placed in an abnormal position in the vehicle 10.

When the state of driver is normal, the controller 100 controls the vehicle 10 to operate in the manual control mode, in step S629.

When the state of driver is abnormal, the controller 100 senses the state of driver until the state of driver turns back to the normal, in step S635. The controller 100 may control the vehicle 10 to continue to operate in the autonomous driving mode even when an emergency situation of the vehicle 10 occurs.

FIG. 7 is a diagram illustrating a scenario in which the controller controls the vehicle, according to another embodiment of the present disclosure.

Referring to (a) of FIG. 7, the vehicle 10 may stop (or park) while the vehicle 10 is operating in the autonomous driving mode. Under the above circumstance, the controller 100 may sense that the user is attempting to open the door of the vehicle 10.

When sensing the user attempting to open the door, the controller 100 may sense objects surrounding the vehicle 10 by using the sensor 203 (e.g., object sensor). Further, the controller 100 may recognize the surrounding environment of the vehicle 10 by using the information regarding the road where the vehicle 10 is positioned (e.g., the shoulder road position, sidewalk road position).

Based on the sensing or the recognizing result regarding the surrounding environment, the controller 100 may control the vehicle 10 to open the door 205-2 in a safe direction in which there is no object, while preventing the door 205-1 from opening while there is object in the surrounding area, as illustrated in (b) of FIG. 7. Further, the controller 100 may control the vehicle 10 to open the door 205-2 when near to a sidewalk.

FIG. 8 is a diagram illustrating a scenario in which the controller controls the vehicle, according to another embodiment of the present disclosure.

Referring to (a) of FIG. 8, the vehicle 10 may operate in the autonomous driving mode.

While the vehicle 10 is operating in the autonomous driving mode, the controller 100 may receive a request to switch to the manual driving mode. For example, the controller may receive a request to switch to the manual driving mode according to user manipulation by pressing the manual switching button 11 provided on the dashboard of the vehicle 10.

In response to the received switch request, the controller 100 may determine an acceleration range that can be manipulated by a driver regarding the acceleration function of the vehicle 10 according to the traffic regulations of the road where the vehicle 10 is driving.

For example, the controller 100 may obtain at least one piece of information among whether a speed camera 801 exists on the road where the vehicle 10 is driving, a speed limitation range, a speed limited area and a speed control area. The information regarding a speed limitation range may be obtained from the memory of the vehicle 10 or the external device 300.

The controller 100 may determine an acceleration range that can be manipulated by a driver with the obtained information. For example, the controller 100 may determine a tilting angle by which the acceleration device of the vehicle 10 can be tilt. Further, the controller 100 may limit a velocity increase rate regarding the vehicle 10 according to a gradient of the acceleration device in the vehicle 10.

When an acceleration range that can be manipulated by a driver is determined, the controller 100 may control the vehicle 10 to operate in the manual driving mode in which an acceleration range of the acceleration device 202 regarding the vehicle 10 is limited, as illustrated in (b) of FIG. 8. For example, when a tilting angle range in which the acceleration device 202 of the vehicle 10 can be tilt without the limitation is $\theta_{81}$, the controller 100 may control the vehicle 10 such that a tilting angle range in which acceleration device 202 is tilt can be $\theta_{82}$.

FIG. 9 is a diagram illustrating a scenario in which the controller controls the vehicle, according to another embodiment of the present disclosure.

Referring to FIG. 9, the vehicle 10 may operate in the autonomous driving mode in which the vehicle is driven on a curved road 901.

While the vehicle 10 is operating in the autonomous driving mode, the controller 100 may receive a request to switch to the manual driving mode. For example, the controller may receive a request to switch to the manual driving mode according to user manipulation of pressing the manual switching button 11 provided on the dashboard of the vehicle 10.

In response to the received switching request, the controller 100 may determine an acceleration range that can be manipulated by a driver regarding the acceleration function of the vehicle according to the degree of the curve of the road where the vehicle 10 is driving.

For example, the controller 100 may obtain at least one piece of information among the curvature information, the tilt information, the surface information, and the weather information regarding the road where the vehicle 10 is driving.

The controller 100 may determine an acceleration range that can be manipulated by a driver with the obtained information.

When an acceleration range that can be manipulated by a driver is determined, the controller 100 may control the vehicle 10 to operate in the manual driving mode in which an acceleration range of the acceleration device 202 in the vehicle 10 is limited, as illustrated in (b) of FIG. 9. For example, when a tilting angle range in which the acceleration device 202 of the vehicle 10 can be tilt without the limitation is $\theta_{91}$, the controller 100 may control the vehicle 10 such that a tilting angle range in which the acceleration device 202 is tilt can be $\theta_{92}$.

Figure 10:
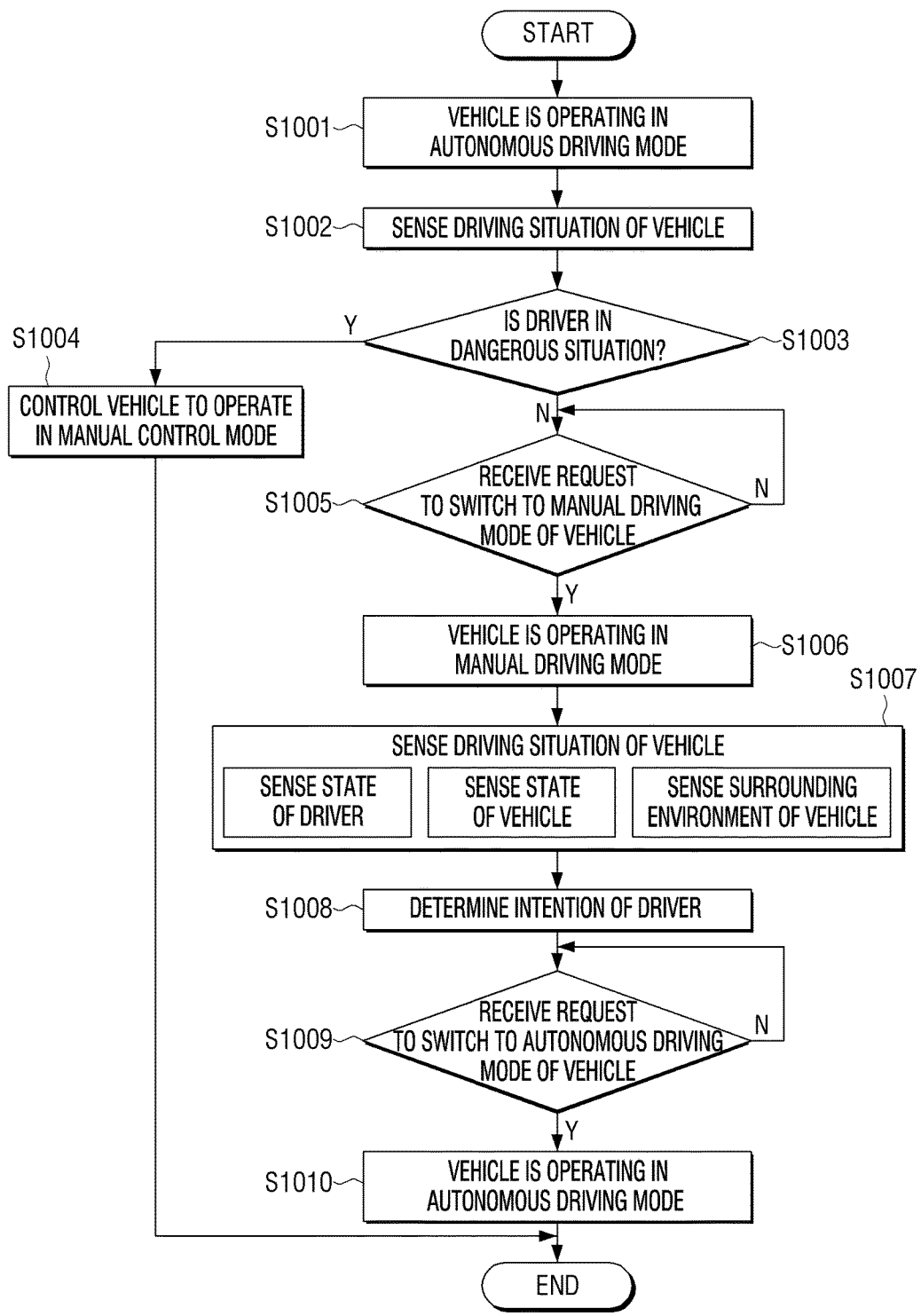
FIGS. 10 to 14 are flowcharts illustrating processes in which the controller controls the vehicle, according to an embodiment of the present disclosure.

FIG. 10 is a flowchart illustrating a process in which the controller controls the vehicle, according to an embodiment of the present disclosure.

Referring to FIG. 10, the vehicle 10 operates in the autonomous driving mode, in step S1001.

Under the above circumstance, the controller 100 senses the driving situation of the vehicle 10, in step S1002. For example, the controller 100 may sense at least one of the state of driver, the state of the vehicle 10, and the surrounding environment of the vehicle 10 (e.g., whether there is an obstacle, lane information).

In step S1003, the controller 100 determines whether a driver of the vehicle 10 is in a dangerous situation by using the sensed driving situation.

When a driver is faced with a dangerous situation, the controller 100 controls the vehicle 10 to complete the autonomous driving mode and to operate in the manual control mode, in step S1004.

When it is determined that a driver is not faced with a dangerous situation, the controller 100 determines whether a request to switch to the manual driving mode is received, in step S1005.

When a request to switch to the manual driving mode is received, the vehicle 10 operates in the manual driving mode, in step S1006.

While operating in the manual driving mode, the controller 100 senses the driving situation of the vehicle 10, in step S1007. The controller 100 senses at least one of the state of driver, the state of the vehicle 10, and the surrounding environment of the vehicle 10 as the driving situation of the vehicle 10.

When sensing the state of driver, the controller 100 may sense at least one of the hand position, the foot position, the gaze, and the eye blinking number regarding a driver, for example.

When sensing the state of the vehicle 10, the controller 100 may sense and compare the previous velocity and the current velocity regarding the vehicle 10. Further, the controller 100 may sense the emergency setting of the vehicle 10. For example, the controller 100 may sense whether the vehicle 10 flicks the emergency light or emits the emergency signal.

When sensing the surrounding environment of the vehicle 10, the controller 100 may sense and compare the previous lane and the current lane of the vehicle 10. Further, the controller 100 may sense and compare the previous driving path and the current driving path of the vehicle 10. Further, the controller 100 may sense another vehicle in the surrounding area.

The controller 100 determines the driver's intention based on the sensed driving situation of the vehicle 10, in step S1008.

For example, when the current velocity is greater than the previous velocity when compared within a certain time, the controller 100 may determine that the driver's intention is to accelerate the vehicle 10.

Further, when the current velocity is less than the previous velocity when compared within a certain time, the controller 100 may determine that the driver's intention is to reduce the velocity of the vehicle 10.

Further, when the path of the vehicle 10 is changed and the vehicle 10 passes another vehicle ahead by comparing the previous lane and the current lane within a certain time, the controller 100 may determine that the driver's intention is to pass a vehicle ahead.

Further, when the vehicle 10 does not return to the previous lane for a certain time after the lane of the vehicle 10 is changed by comparing the previous lane and the current lane within a certain time, the controller 100 may determine that the driver's intention is to simply change the lane.

Further, when the path of the vehicle 10 is changed by comparing the previous path and the current path within a certain time, the controller 100 may determine that the driver's intention is to be out of the current path and to change to a new path.

Further, when the vehicle 10 senses the emergency setting, the controller 100 may determine that the driver's intention is to drive urgently under the emergency situation.

Further, when another vehicle continues to be sensed while keeping a certain distance near to the vehicle 10 for a certain time, the controller 100 may determine that the driver's intention is to follow another vehicle.

When the vehicle 10 is operating in the manual driving mode, the controller 100 determines whether to receive a request to switch to the autonomous driving mode of the vehicle 10, in step S1009.

When a request to switch to the autonomous driving mode is received, the controller 100 controls the vehicle 10 to operate in the autonomous driving mode, in step S1010, which is established according to the driver's intention determined in step S1008.

For example, when determining that the driver's intention is to accelerate the vehicle 10, the controller 100 may control the vehicle 10 to operate in the autonomous driving mode, which is established such that the vehicle 10 can drive at the road limited velocity or at the maximum velocity in which the autonomous driving can be performed.

Further, when it is determined that the driver's intention is to reduce the velocity of the vehicle 10, the controller 100 may control the vehicle 10 to operate in the autonomous driving mode, which is established such that the vehicle 10 can drive by limiting the velocity while keeping a safe distance from a surrounding vehicle.

Further, when it is determined that the driver's intention is to pass a car, the controller 100 may control the vehicle 10 to operate in the autonomous driving mode, which is established such that the vehicle 10 can return to the lane where the vehicle 10 is driving before passing the other car.

Further, when it is determined that the driver's intention is to simply change the lane, the controller 100 may control the vehicle 10 to operate in the autonomous driving mode, which is established such that the vehicle 10 can be driven in the current lane.

Further, when it is determined that the driver's intention is to change to a new path, the controller 100 may control the vehicle 10 to operate in the autonomous driving mode, which is established such that the vehicle 10 can be driven on the current path.

Further, when it is determined that driver's intention is to drive urgently under an emergency situation, the controller 100 may control the vehicle 10 to operate in the autonomous driving mode, which is established such that the driving can be performed toward a place designated by a driver while the road signals are ignored.

Further, when it is determined that the driver's intention is to follow another vehicle, the controller 100 may control the vehicle 10 to operate in the autonomous driving mode, which is established such that the driving can be performed by keeping a certain distance with another vehicle.

In addition, when it is determined that the driver's intention is to change a destination, the controller 100 may control the vehicle 10 to operate in the autonomous driving mode, which is established such that the driving can be performed toward the changed destination.

Referring to FIG. 10, the controller 100 determines the driver's intention, in step S1008. When a request to switch to the autonomous driving mode of the vehicle 10 is received at step S1009, the vehicle 10 may operate in the autonomous driving mode which is established according to the determined driver's intention, in step S1010. However, the order of the above-described operations can be changed.

For example, when a request to switch to the autonomous driving mode of the vehicle 10 is received in step S1009, the controller 100 may sense the driving situation of the vehicle 10, in step S1007. Further, the controller 100 may determine the driver's intention based on the sensed driving situation, in step S1008, and control the vehicle 10 to operate in the autonomous driving mode, which is established according to the determined intention.

Figure 11:
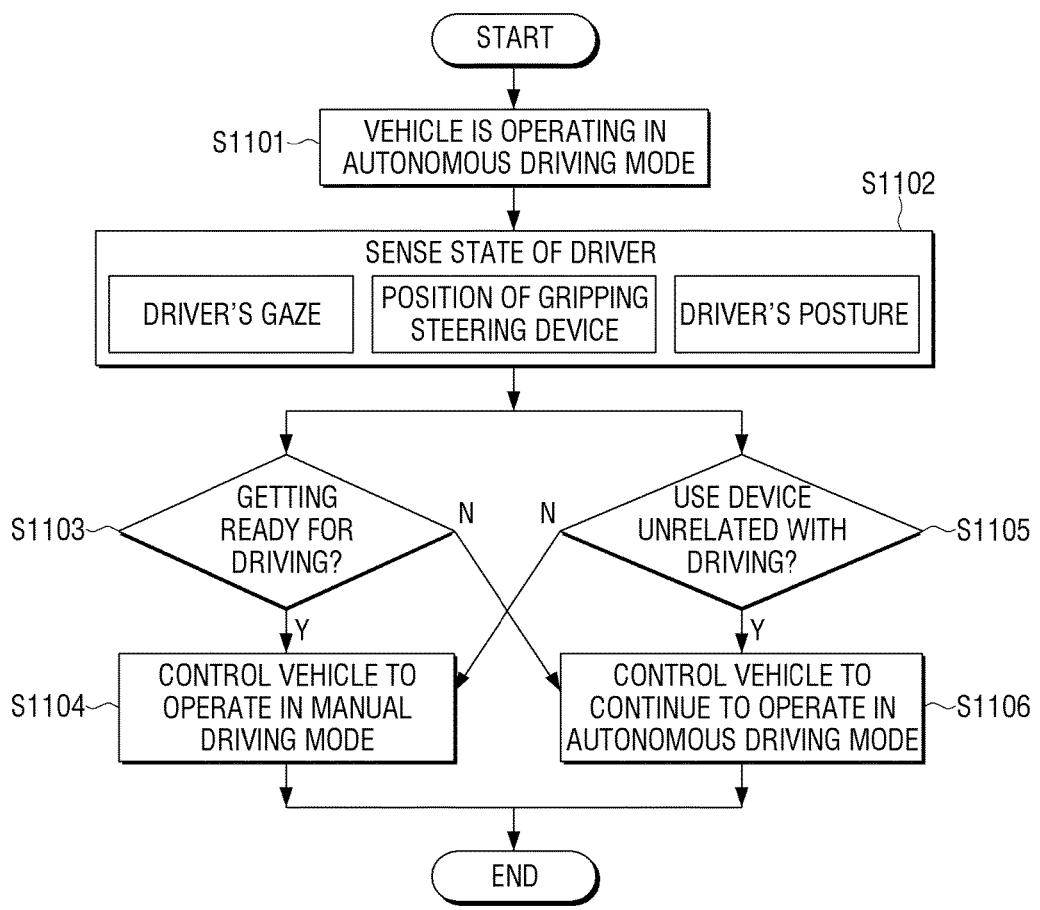

FIG. 11 is a flowchart illustrating a process in which the controller controls the vehicle, according to another embodiment of the present disclosure.

The controller 100 may perform a noise filter function such that the vehicle 10 may not operate in the manual driving mode due to the unnecessary actions of a driver while operating in the autonomous driving mode.

For example, when a driver does not view the front area or a driving posture of a driver is abnormal, or positions of the driver's hands on the steering device are abnormal while the vehicle 10 is driving in the autonomous driving mode, the controller 100 may ignore the driver's input. Further, when a driver uses an entertainment device unrelated to controlling the vehicle 10, the controller 100 may ignore the driver's input while using the entertainment device.

Referring to FIG. 11, the vehicle 10 operates in the autonomous driving mode, in step S1101.

Under the above circumstance, the controller 100 senses the state of driver, in step S1102.

For example, the controller 100 may sense at least one of the driver's gaze, positions where a driver holds the steering device 201, and the posture of the driver.

The controller 100 may determine the driver's intention based on the information regarding the sensed state of driver.

For example, in determining the driver's intention, the controller 100 may determine whether the driver's intention is to get ready for driving, in step S1103.

When it is determined that the driver's intention is to get ready for driving, the controller 100 controls the vehicle 10 to operate in the manual driving mode, in step S1104. Further, the controller 100 may make preparations such that the vehicle 10 can operate in the manual control mode.

When it is determined that the driver's intention is not to get ready for driving, the controller 100 may ignore the determined driver's intention, and control the vehicle 10 to continue to operate in the autonomous driving mode, in step S1106.

In another example, in determining the driver's intention, the controller 100 determines whether a driver uses a device unrelated to driving the vehicle 10, in step S1105. For example, the controller 100 may determine whether a driver uses an entertainment device unrelated to driving such as, for example, a portable phone, a tablet, or a smart watch.

When a driver uses a device unrelated with the driving, the controller 100 determines that the driver's intention is not to control the vehicle 10, and controls the vehicle 10 to continue to operate in the autonomous driving mode, in step S1106.

When a driver uses a device related to driving (e.g., navigation), the controller 100 determines that the driver's intention is to be ready for driving, and controls the vehicle 10 to operate in the manual driving mode, in step S1104.

Figure 12:
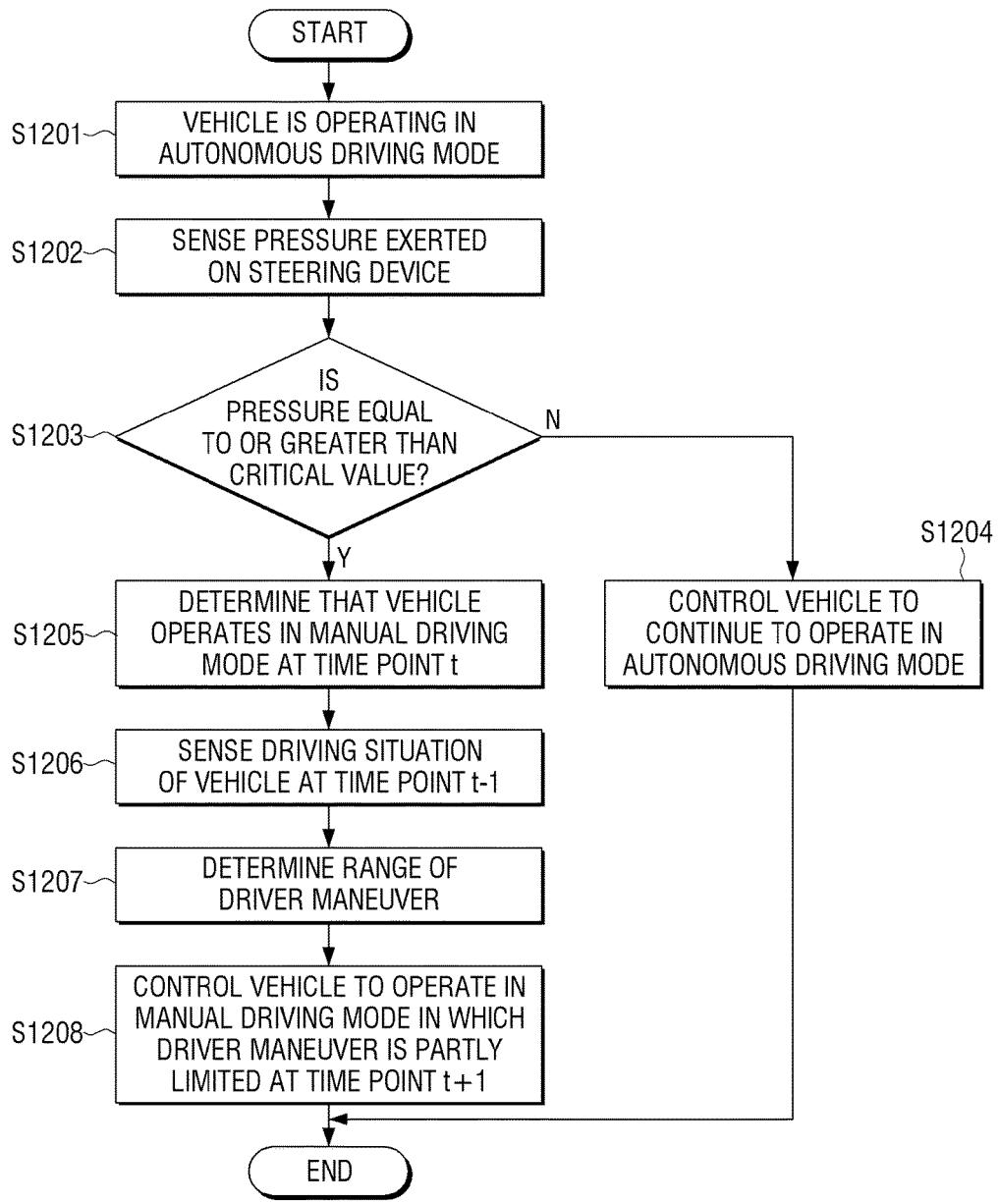

FIG. 12 is a flowchart illustrating a process in which the controller controls the vehicle, according to another embodiment of the present disclosure.

Referring to FIG. 12, the vehicle 10 operates in the autonomous driving mode, in step S1201.

The controller 100 senses the pressure exerted on the steering device 201, in step S1202.

The controller 100 determines whether the applied pressure is greater than or equal to a critical value, in step S1203.

When the pressure is less than a critical value, the controller 100 controls the vehicle 10 to continue to operate in the autonomous driving mode, in step S1204.

Meanwhile, when the pressure is greater than or equal to a critical value, the controller 100 determines that the vehicle 10 operates in the manual driving mode at time point t, in step S1205. The controller 100 senses the driving situation of the vehicle 10 at time point t–1, which is previous to time point t, when the manual driving mode is determined, in step S1206. For example, the controller 100 may sense at least one of the state of driver, the state of the vehicle 10 (e.g., position of the vehicle 10) and the surrounding environment of the vehicle 10 (e.g., obstacle, another vehicle, lane) at time point t–1.

According to the sensed driving situation of the vehicle, the controller 100 determines a range of the driver's maneuver regarding one function from among a plurality of the driving functions (e.g., a steering function, an acceleration function) in the vehicle 10, in step S1207.

In step S1208, the controller 100 controls the vehicle 10 to operate in the manual driving mode in which the driver's manipulation is partly limited according to the determined range of the manipulation at time point t+1.

Thus, when the change occurs in terms of the controlled object in which the operating is performed in the manual driving mode from the autonomous driving mode at time point t, the controller 100 may sense the driving situation of the vehicle 10 at time point t–1, and control the vehicle 10 to operate in the manual driving mode at time point t+1 by considering the result of sensing the vehicle 10. Thus, the time for a driver to be adapted to the driving of the vehicle 10 can be provided in spite of the rapid change in the controlled object.

Further, the controller 100 may control the vehicle 10 to switch to the manual driving mode from the autonomous driving mode according to a critical value of the pressure exerted on the steering device 201. Therefore, the controller 100 may determine whether the rapid change is a simple mistake of a driver or driver's intention to switch to the manual driving mode.

Figure 13:
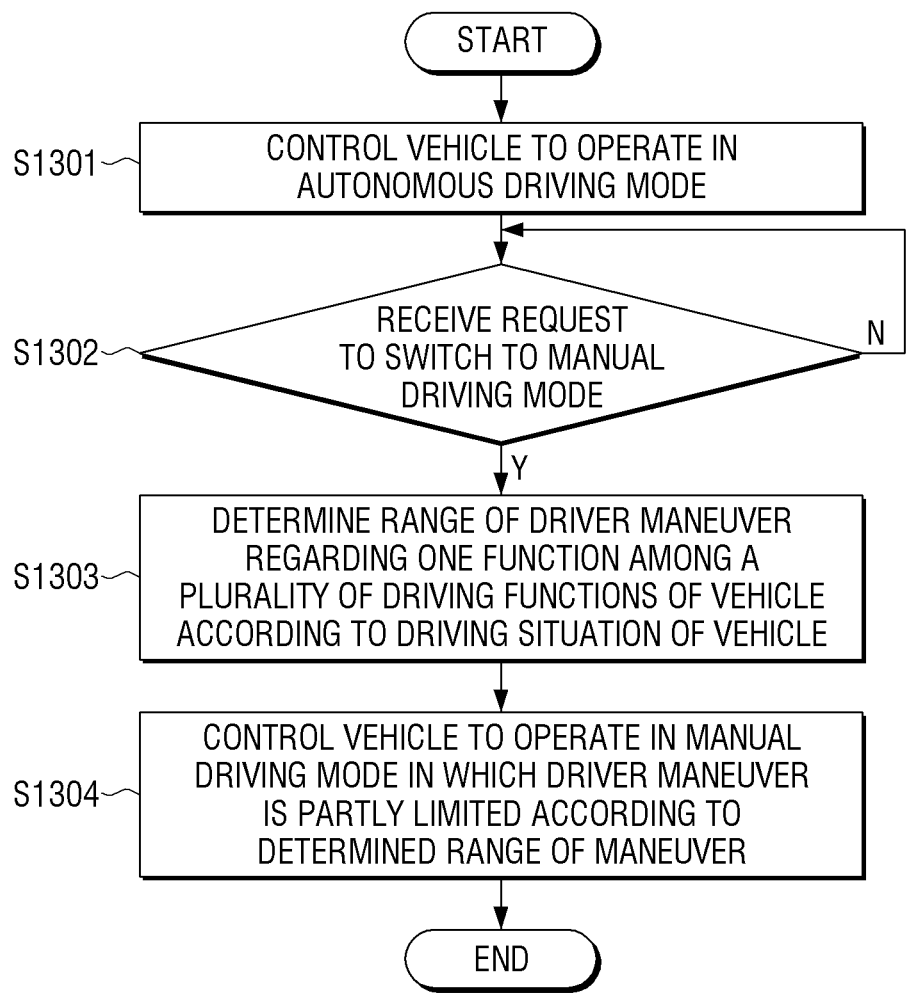

FIG. 13 is a flowchart illustrating a process in which the controller controls the vehicle, according to another embodiment.

Referring to FIG. 13, the controller 100 controls the vehicle 10 to operate in the autonomous driving mode in which the vehicle 10 is driving without the driver's manipulation, in step S1301.

While the vehicle 10 is operating in the autonomous driving mode, the controller 100 determines whether a request to switch to the manual driving mode is received, in step S1302.

When a request to switch to the manual driving mode is received, the controller 100 determines a range of the driver's maneuver regarding one function among a plurality of the driving functions in the vehicle 10 according to the driving situation of the vehicle 10, in step S1303.

For example, the controller 100 may determine a steering range that can be manipulated by a driver regarding the steering function of the vehicle 10 according to the degree of a curve or the traffic regulations regarding the road where the vehicle 10 is driving. Further, the controller 100 may determine an acceleration range that can be manipulated by a driver regarding the acceleration function of the vehicle 10 according to the degree of a curve or the traffic regulations regarding the road where the vehicle 10 is driving. Further, the controller 100 may determine a steering range or an acceleration range that can be manipulated by a driver regarding the steering function of the vehicle 10 according to the state of another vehicle on the lane neighboring the lane where the vehicle 10 is driving. Further, the controller 100 may determine a rotation angle by which the steering device 201 provided on the vehicle 10 can be rotated by a driver. Further, the controller 100 may determine a tilting angle by which the acceleration device 202 provided on the vehicle 10 can be tilt, or a velocity increase rate according to a gradient of the acceleration device 202.

When a range of the driver's manipulation is determined, the controller 100 controls the vehicle 10 to operate in the manual driving mode in which the driver's maneuver is partly limited according to the determined range of the maneuver, in step S1304.

Figure 14:
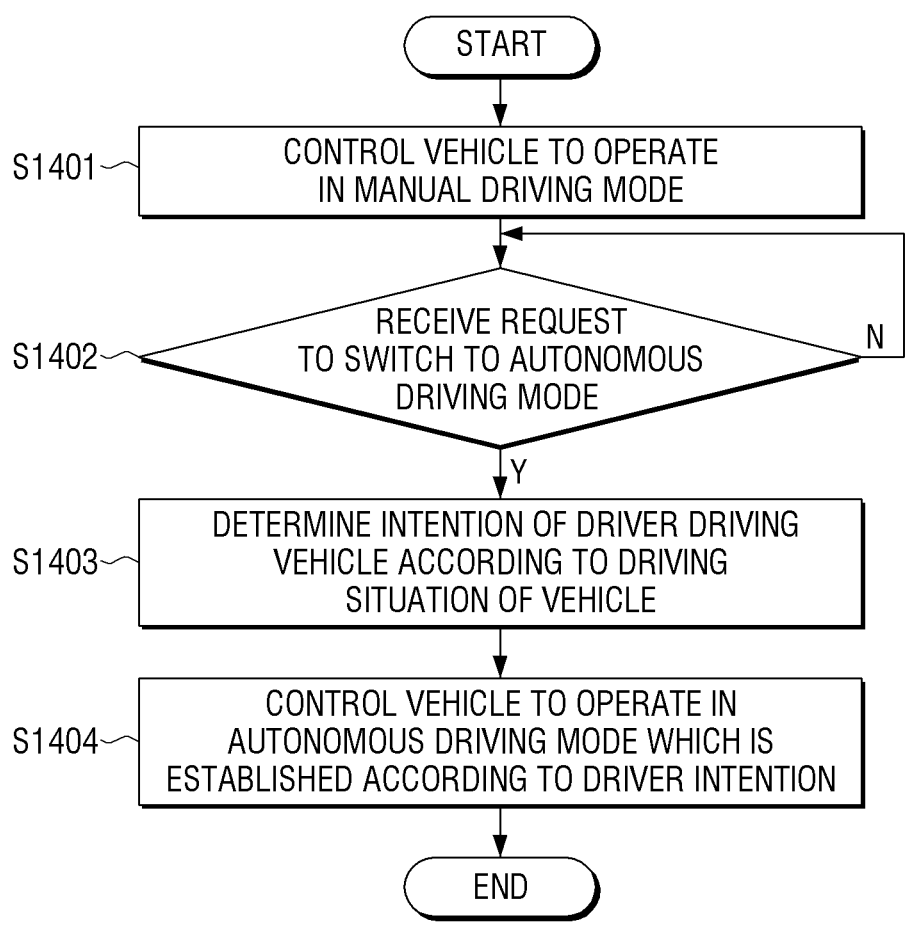

FIG. 14 is a flowchart illustrating a process in which the controller 100 controls the vehicle 10, according to another embodiment of the present disclosure.

Referring to FIG. 14, the controller 100 controls the vehicle 10 to operate in the manual driving mode, in step S1401.

While the vehicle 10 is operating in the manual driving mode, the controller 100 determines whether a request to switch to the autonomous driving mode is received, in step S1402.

When the request is received, the controller 100 determines the intention of a driver who drives the vehicle 10 according to the driving situation of the vehicle 10, in step S1403. For example, the controller 100 may determine the intention of a driver who drives the vehicle 10 based on at least one of the state of driver, the state of the vehicle 10, and the surrounding environment of the vehicle 10.

The controller 100 controls the vehicle 10 to operate in the autonomous driving mode, which is established according to the determined driver's intention, in step S1404. For example, when determining the driver's intention is to reduce the velocity of the vehicle 10, the controller 100 controls the vehicle 10 to operate in the autonomous driving mode in which the velocity is limited.

According to the various embodiments, when the vehicle 10 is switched to the autonomous driving mode from the manual driving mode, the controller 100 may control the vehicle 10 to switch to the autonomous driving mode by considering various autonomous driving parameters in which the state of driver is recognized.

For example, a call or a message may be received at a portable terminal of a driver while the vehicle 10 is operating in the manual driving mode.

In order to confirm the received call or message, a driver may lift off the lock-on screen of the portable terminal, hold the portable terminal, or identify the fingerprints through the portable terminal.

When sensing the driver's manipulation to confirm a call or a message, the portable terminal may transmit a signal requesting the driving situation of a driver or the autonomous driving mode.

In response, the controller 100 may control the vehicle 10 to operate in the autonomous driving mode.

According to another embodiment, a driver may feel tired while the vehicle 10 is operating in the manual driving mode.

The controller 100 may sense the abnormal driving of the vehicle 10. Further, the controller 100 may determine that a driver feels tired based on the gaze or the action of a driver.

Thereby, the controller 100 may forcibly control the vehicle 10 to operate in the autonomous driving mode. Further, after a certain time, the controller 100 may provide a user interface to request a driver whether the vehicle 10 is to operate in the manual driving mode again. When a driver performs an input to operate the vehicle 10 in the manual driving mode through the user interface, the controller 100 may control the vehicle 10 to operate in the manual driving mode.

According to another embodiment, the controller 100 may continue to sense the moving velocity of the vehicle 10 while the vehicle 10 is operating in the manual driving mode.

As a result, when the driver is bored, the controller 100 may provide the user interface to request whether the vehicle 10 is to operate in the autonomous driving mode. When a driver performs an input to operate the vehicle 10 in the autonomous driving mode through the user interface, the controller 100 may operate the vehicle in the autonomous driving mode.

According to the various embodiments, while the vehicle 10 is operating in the autonomous driving mode, the controller 100 may control the vehicle 10 to selectively operate in the manual driving mode according to the object manipulated by a driver.

For example, when it is determined that a driver is to manipulate at least one of the steering device 201, the acceleration device 202, the deceleration device 208, and a gear shift device, the controller 100 may control the vehicle 10 to switch to the manual driving mode.

When a driver manipulates a headlight or a taillight of the vehicle 10, the controller 100 may control the vehicle 10 to switch to the autonomous driving mode which is established according to the driver's intention. For example, when it is determined that a driver manipulates a left directional light of the vehicle, the controller 100 may control the vehicle 10 to drive in the autonomous driving mode while turning toward the left or moving toward the left lane. In another example, when a driver selects an emergency stop button, the controller 100 may control the vehicle 10 to drive in the autonomous driving mode in which the vehicle 10 stops while moving toward the edge lane of the road.

Further, when a driver manipulates an air conditioner, a radio, or a seat position of the vehicle 10, the controller 100 may control the vehicle 10 to continue to operate in the autonomous driving mode in which the vehicle 10 is previously operating.

Figure 15:
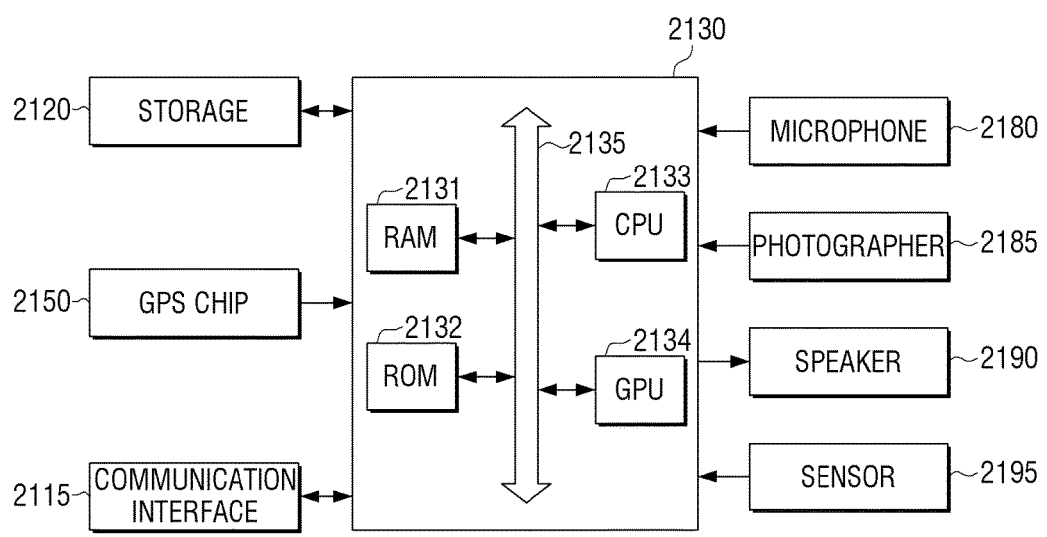
FIG. 15 is a block diagram illustrating a controller, according to an embodiment of the present disclosure.

Referring to FIG. 15, a block diagram illustrates a controller, according to an embodiment of the present disclosure.

The controller 100 may be embodied as a portable terminal apparatus.

The portable terminal apparatus includes a communication interface 2115, the controller 2130 (e.g., processor), a storage 2120 (e.g., memory), GPS chip 2150, a microphone 2180, a camera 2185, a speaker 2190, and a sensor 2195.

The communication interface 2115 may perform communication with various types of the external devices (e.g., the vehicle 10 or a server) according to various formats of the communication methods. The controller 2130 may perform communication with the various external devices by using the communication interface 2115.

The communication interface 2115 may perform the communication according to a WiFi method and a Bluetooth method. The communication interface 2115 may first transmit and receive various connecting information such as, for example, SSID and session keys, connect the communication by using the connecting information, and transceive various pieces of information. Further, the communication interface 2115 may perform communication according to IEEE, Zigbee, 3G, 3GPP, and LTE.

The storage 2120 may store various programs and data necessary for the operation of the portable terminal apparatus 2000. Specifically, the storage 2120 may store programs and data to generate various UIs constituting the screen.

The GPS chip 2150 is provided to receive a GPS signal from a GPS satellite, and calculate the current position of the portable terminal apparatus 2000.

The controller 2130 may calculate the driver position by using the GPS chip 2150 when the navigation program is used or when the current position of a driver is requested.

Further, the controller 2130 may calculate the position of the vehicle 10 by using the GPS chip 2150 when the position of the vehicle 10 is requested.

The speaker 2190 may output the audio data. For example, the speaker 2190 may output the alarm sounds for switching the driving mode of the vehicle 10. Further, the speaker 2190 may output the audio data indicating the state of driver, the state of the vehicle, or the state of the surrounded devices, or output the alarm sounds informing of the emergency situation.

The microphone 2180 is provided to receive the input of the driver's voice or other sounds, and convert them into audio data. The controller 2130 may use the driver's voice inputted through the microphone 2180 during the calling, or may store them in the storage 2120 after switching to the audio data. Meanwhile, the microphone 2180 may be embodied as a stereo microphone to receive sounds input from a plurality of positions.

Further, the microphone 2180 may receive sounds generated in the area surrounding the vehicle 10, and convert them to the audio data. The controller 2130 may determine the state of driver, the state of the vehicle 10, or the surrounding environment state of the vehicle 10 based on the converted audio data.

The camera 2185 is provided to photograph a still image or a video according to the control of a driver. The camera 2185 may include both a front facing camera and rear facing camera. As described above, the camera 2185 may be used to obtain the image of the driver in tracking the gaze of the driver. Further, the camera 2185 may photograph the internal or the external area of a driver or the vehicle 10. The controller 2130 may determine the state of driver, the state of the vehicle 10, or the surrounding environment state of the vehicle 10 based on the photographed data.

The sensor 2195 may sense the surrounding environment of the portable terminal apparatus 2000, the user interaction, or the state change in the portable terminal apparatus 2000. For example, the sensor 2195 may transmit the sensed values or the information extracted from the sensed values to the controller 2130.

The sensor 2195 may include various sensors. For example, the sensor 2195 may include at least one of a touch sensor, an acceleration sensor, a gyro sensor, an illumination sensor, a proximity sensor, a pressure sensor, a noise sensor (e.g., microphone), a video sensor (e.g., camera module), a pen sensor, and a timer.

The controller 2130 may receive a request to switch the driving mode of the vehicle 10. For example, the controller 2130 may receive a request to switch the driving mode from the communicator 207 of the vehicle 10 according to the driver's manipulation to press the manual switching button of the vehicle 10. Further, the controller 2130 may receive a request to switch the driving mode according to the event occurring based on the values sensed in the sensor 203 of the vehicle 10 or the sensor 2195.

In response to the received switch request, the controller 2130 may determine a range of the driver's manipulation regarding one function among a plurality of the driving functions in the vehicle 10 according to the driving situation of the vehicle 10. For example, the controller 2130 may determine the driving situation of the vehicle 10 based on the values sensed in the sensor 203 of the vehicle 10. Further, the controller 2130 may determine the driving situation of the vehicle 10 based on the values sensed in the microphone 2180, the camera 2185 or the sensor 2195 of the vehicle 10.

The controller 2130 may determine a range of the driver's manipulation regarding one function among a plurality of the driving functions in the vehicle 10 according to the determined driving situation. Further, according to the determined range of the manipulation, the controller 2130 may transmit a control command to operate the vehicle 10 in the manual driving mode in which the driver's manipulation is partly limited through the communication interface 2115 to the vehicle 10.

Further, the controller 2130 may determine the intention of a driver driving the vehicle 10 according to the determined driving situation. Further, the controller 2130 may transmit a control command to operate the vehicle 10 in the autonomous driving mode which is established according to the determined driver's intention through the communication interface 2115 to the vehicle 10.

The controller 2130 includes a RAM 2131, a ROM 2132, a CPU 2133, a graphic processing unit (GPU) 2134, and a bus 2135. RAM 2131, ROM 2132, CPU 2133, and GPU 2134 may be connected to each other through the bus 2135.

The CPU 2133 may access to the storage 2120, and perform the booting by using the stored operating system (O/S) in the storage 2120. Further, CPU 2133 may perform various operations by using various programs, contents, and data stored in the storage 2120.

The ROM 2132 may store command sets for the system booting. When a turn-on command is inputted and when the electrical power is provided, the CPU 2133 may copy the stored O/S in the storage 2120 to the RAM 2131 according to the stored commands in the ROM 2132, and boot the system by implementing O/S. When the booting completes, the CPU 2133 may copy the various programs stored in the storage 2120 to the RAM 2131, and perform various operations by implementing the programs copied to the RAM 2131.

The GPU 2134 may display a UI on a touch screen when the booting of the electronic device 100 completes.

Meanwhile, although the controller 2130 is described to include the RAM 2131, the ROM 2132, the CPU 2133 and the GPU 2134, it may not be limited thereto. The controller 2130 may include some units among the RAM 2131, the ROM 2132, the CPU 2133, and the GPU 2134, and may be connected to the other units externally from the controller 2130.

The method (e.g., operations) according to the embodiments may be performed by at least one processor (e.g., controller 100) performing the instructions included in at least one program among the programs maintained in computer-readable storage media.

When the instructions described above are executed by a processor (e.g., controller 100), at least one processor may perform a function corresponding to the instructions. Herein, the computer-readable storage media may be a memory, for example.

The programs may be included in the computer-readable storage media such as hard disk, floppy disk, magnetic media (e.g., magnetic tape), optical media (e.g., compact disc ROM (CD-ROM), digital versatile disc (DVD)), magneto-optical media (e.g., floptical disk), and hardware device (e.g., ROM, RAM, flash memory). In this case, the storage media may be included as a part of the constitution of the vehicle 10. However, the storage media may be attached through a port of the vehicle 10, or included in an external device positioned externally from the vehicle 10 (e.g., cloud, server, another electronic device). Further, the programs may be distributed and stored in a plurality of the storage media. Herein, at least part of a plurality of the storage media may be positioned on the external device of the vehicle 10.

The instructions may include high language codes that can be implemented with a computer by using an interpreter as well as mechanical codes that can be generated by a compiler. The hardware device described above may be configured to operate as at least one software module in order to perform the operations according to the various embodiments, or vice versa.

The present disclosure may be utilized in conjunction with the manufacture of integrated circuits, chip sets, or system-on-chips (SoCs). One skilled in the art would know how to dice wafers and package die to produce integrated circuits. Integrated circuits so manufactured are considered part of this disclosure.

While the present disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. A method of a controller for controlling a vehicle, the method comprising:
controlling the vehicle to operate in an autonomous driving mode in which the vehicle is driven without a manipulation by an operator of the vehicle;
receiving a request to switch to a manual driving mode in which the vehicle is driven with the manipulation by the operator;
in response to the request, determining whether a range of the manipulation regarding a function of the vehicle is to be unlimited in the manual driving mode according to at least one of a state of the operator, a state of the vehicle, and a surrounding environment of the vehicle; and
controlling the vehicle to operate in the manual driving mode with a limited or an unlimited range of the manipulation regarding the function of the vehicle.

2. The method of claim 1, wherein determining the range of the manipulation comprises determining a steering range that can be manipulated by the operator regarding a steering function of the vehicle according to a degree of curve or traffic regulations regarding a road on which the vehicle is driven.

3. The method of claim 1, wherein determining the range of the manipulation comprises determining an acceleration range that can be manipulated by the operator regarding an acceleration function of the vehicle according to a degree of curve or traffic regulations regarding a road on which the vehicle is driven.

4. The method of claim 1, wherein determining the range of the manipulation comprises determining a steering range or an acceleration range that can be manipulated by the operator regarding a steering function of the vehicle according to a state of another vehicle in a lane neighboring a lane in which the vehicle is driven.

5. The method of claim 1, wherein, when a steering range that can be manipulated by the operator is determined, determining the range of the manipulation comprises determining a rotation angle by which a steering device of the vehicle can be rotated by the operator.

6. The method of claim 1, wherein, when an acceleration range that can be manipulated by the operator is determined, determining the range of the driver's manipulation comprises determining a tilting angle by which an acceleration device of the vehicle can be tilt or determining a velocity increase rate according to a gradient of the acceleration device.

7. The method of claim 1, wherein the request to switch to the manual driving mode comprises at least one of a switch request generated when the operator presses a manual switching button, a switch request according to an event occurring based on a state of driver, a switch request according to an event occurring based on a state of the vehicle, and a switch request according to an event occurring based on a surrounding environment of the vehicle.

8. A controller for controlling a vehicle, comprising:
a mode switch receiver configured to receive a request to switch to a manual driving mode, in which the vehicle is driven with a manipulation by an operator of the vehicle, while the vehicle is operating in an autonomous driving mode, in which the vehicle is driven without the manipulation by the operator;
a driving state determiner configured to, in response to the request, determine whether a range of the manipulation regarding a function of the vehicle is to be unlimited in the manual driving mode according to at least one of a state of the operator, a state of the vehicle, and a surrounding environment of the vehicle; and
a driving mode controller configured to control the vehicle to operate in the manual driving mode with a limited or an unlimited range of the manipulation regarding the function of the vehicle.

9. The controller of claim 8, wherein, when the range of the manipulation is determined, the driving state determiner is further configured to determine a steering range that can be manipulated by the operator regarding a steering function of the vehicle according to a degree of curve or traffic regulations regarding a road on which the vehicle is driven.

10. The controller of claim 8, wherein, when the range of the manipulation is determined, the driving state determiner is further configured to determine an acceleration range that can be manipulated by the operator regarding an acceleration function of the vehicle according to a degree of curve or traffic regulations regarding a road on which the vehicle is driven.

11. The controller of claim 8, wherein, when the range of the manipulation is determined, the driving state determiner is further configured to determine a steering range or an acceleration range that can be manipulated by the operator regarding the steering function of the vehicle according to a state of another vehicle in a lane neighboring a lane in which the vehicle is driven.

12. The controller of claim 8, wherein, when a steering range that can be manipulated by the operator is determined as the range of the manipulation, the driving state determiner is further configured to determine a rotation angle by which a steering device of the vehicle can be rotated by the operator.

13. The controller of claim 8, wherein, when an acceleration range that can be manipulated by the operator is determined as the range of the manipulation, the driving state determiner is further configured to determine a tilting angle by which an acceleration device of the vehicle can be tilt or determines a velocity increase rate according to a gradient of the acceleration device.

14. The controller of claim 8, wherein the request to switch to the manual driving mode comprises at least one of a switch request generated when the operator presses a manual switching button, a switch request according to an event occurring based on a state of driver, a switch request according to an event occurring based on a state of the vehicle, and a switch request according to an event occurring based on a surrounding environment of the vehicle.

* * * * *